(12) United States Patent
Katsavounidis

(10) Patent No.: US 10,917,644 B2
(45) Date of Patent: *Feb. 9, 2021

(54) ITERATIVE TECHNIQUES FOR ENCODING VIDEO CONTENT

(71) Applicant: NETFLIX, INC., Los Gatos, CA (US)

(72) Inventor: Ioannis Katsavounidis, San Jose, CA (US)

(73) Assignee: NETFLIX, INC., Los Gatos, CA (US)

(*) Notice: Subject to any disclaimer, the term of this patent is extended or adjusted under 35 U.S.C. 154(b) by 124 days.

This patent is subject to a terminal disclaimer.

(21) Appl. No.: 15/902,976

(22) Filed: Feb. 22, 2018

(65) Prior Publication Data

US 2018/0242002 A1    Aug. 23, 2018

Related U.S. Application Data

(60) Provisional application No. 62/462,873, filed on Feb. 23, 2017, provisional application No. 62/534,170, (Continued)

(51) Int. Cl.
*H04N 19/147* (2014.01)
*H04N 19/172* (2014.01)
(Continued)

(52) U.S. Cl.
CPC ..... *H04N 19/147* (2014.11); *G11B 20/00007* (2013.01); *G11B 27/3081* (2013.01);
(Continued)

(58) Field of Classification Search
CPC .. H04N 19/147; H04N 19/124; H04N 19/172; H04N 19/177; H04N 19/179; H04N 19/192; H04N 19/198; H04N 19/59
See application file for complete search history.

(56) References Cited

U.S. PATENT DOCUMENTS

| 5,612,742 A | 3/1997 | Krause et al. |
| 7,394,410 B1 | 7/2008 | Wegener |

(Continued)

FOREIGN PATENT DOCUMENTS

EP    2 410 749 A1    1/2012

OTHER PUBLICATIONS

International Search Report for application No. PCT/US2018/019575 dated Apr. 9, 2018.
(Continued)

*Primary Examiner* — Jamie J Atala
*Assistant Examiner* — Hesham K Abouzahra
(74) *Attorney, Agent, or Firm* — Artegis Law Group, LLP

(57) ABSTRACT

In various embodiments, an iterative encoding application encodes a source video sequence. The encoding optimization application generates a set of shot encode points based on a set of encoding points and a first shot sequence included in the source video sequence. Each shot encode point is associated with a different encoded shot sequence. The encoding optimization application performs convex hull operation(s) across the set of shot encode points to generate a first convex hull associated with the first shot sequence. Subsequently, the encoding optimization application generates encoded video sequences based on the first convex hull and a second convex hull associated with a second shot sequence included in the source video sequence. The encoding optimization application computes a new encoding point based on the encoded video sequences and a target value for a first video metric and then generates an optimized encoded video sequence based on the new encoding point.

20 Claims, 10 Drawing Sheets

Related U.S. Application Data filed on Jul. 18, 2017, provisional application No. 62/550,517, filed on Aug. 25, 2017.

(51) Int. Cl.

| | |
|---|---|
| H04N 19/192 | (2014.01) |
| H04N 19/124 | (2014.01) |
| H04N 21/2343 | (2011.01) |
| H04N 21/238 | (2011.01) |
| H04N 19/179 | (2014.01) |
| H04N 21/845 | (2011.01) |
| H04N 21/234 | (2011.01) |
| H04L 29/06 | (2006.01) |
| H04N 19/177 | (2014.01) |
| G11B 20/00 | (2006.01) |
| G11B 27/30 | (2006.01) |
| G11B 27/34 | (2006.01) |
| H04N 19/196 | (2014.01) |
| H04N 19/59 | (2014.01) |
| H04N 19/126 | (2014.01) |
| H04N 19/15 | (2014.01) |
| H04N 19/40 | (2014.01) |

(52) U.S. Cl.
CPC .......... *G11B 27/34* (2013.01); *H04L 65/4084* (2013.01); *H04L 65/602* (2013.01); *H04L 65/604* (2013.01); *H04L 65/607* (2013.01); *H04L 65/80* (2013.01); *H04N 19/124* (2014.11); *H04N 19/172* (2014.11); *H04N 19/177* (2014.11); *H04N 19/179* (2014.11); *H04N 19/192* (2014.11); *H04N 19/198* (2014.11); *H04N 19/59* (2014.11); *H04N 21/23418* (2013.01); *H04N 21/23439* (2013.01); *H04N 21/23805* (2013.01); *H04N 21/234363* (2013.01); *H04N 21/8456* (2013.01); *G11B 2020/00072* (2013.01); *H04N 19/126* (2014.11); *H04N 19/15* (2014.11); *H04N 19/40* (2014.11); *H04N 21/8455* (2013.01)

(56) References Cited

U.S. PATENT DOCUMENTS

| | | |
|---|---|---|
| 8,837,601 B2 | 9/2014 | Ronca et al. |
| 9,398,301 B2 | 7/2016 | Ronca et al. |
| 9,584,700 B2 | 2/2017 | Morovic et al. |
| 10,074,382 B2 | 9/2018 | Hoerich et al. |
| 10,666,992 B2 | 5/2020 | Katsavounidis |
| 2002/0116715 A1 | 8/2002 | Apostolopoulos |
| 2004/0161158 A1 | 8/2004 | Kondo et al. |
| 2005/0031219 A1 | 2/2005 | Puri et al. |
| 2007/0047639 A1 | 3/2007 | Ye |
| 2008/0043832 A1 | 2/2008 | Barkley et al. |
| 2008/0232466 A1 | 9/2008 | Faerber et al. |
| 2009/0295905 A1 | 12/2009 | Civanlar et al. |
| 2010/0189183 A1 | 7/2010 | Gu et al. |
| 2011/0052087 A1* | 3/2011 | Mukherjee ............ H04N 19/14 382/248 |
| 2011/0075734 A1 | 3/2011 | Sakazume |
| 2011/0090949 A1 | 4/2011 | Gu |
| 2012/0147958 A1* | 6/2012 | Ronca ................ H04N 19/14 375/240.16 |
| 2012/0195369 A1 | 8/2012 | Guerrero |
| 2013/0089154 A1 | 4/2013 | Chen et al. |
| 2013/0329781 A1 | 12/2013 | Su et al. |
| 2014/0040498 A1 | 2/2014 | Oyman et al. |
| 2014/0201324 A1 | 7/2014 | Zhang et al. |
| 2014/0241418 A1 | 8/2014 | Garbas et al. |
| 2014/0294362 A1* | 10/2014 | Pettersson ............ H04N 17/004 386/264 |
| 2015/0071346 A1 | 3/2015 | Ronca et al. |
| 2015/0127337 A1 | 5/2015 | Heigold et al. |
| 2015/0370796 A1 | 12/2015 | Abramson et al. |
| 2016/0212433 A1 | 7/2016 | Zhu et al. |
| 2016/0379057 A1 | 12/2016 | Katsavounidis |
| 2017/0078686 A1 | 3/2017 | Coward et al. |
| 2017/0186147 A1 | 6/2017 | He et al. |
| 2018/0007355 A1 | 1/2018 | Borel et al. |
| 2018/0063549 A1 | 3/2018 | Amer et al. |
| 2018/0160161 A1 | 6/2018 | Reznik et al. |
| 2018/0240502 A1 | 8/2018 | Katsavounidis |
| 2018/0241795 A1 | 8/2018 | Katsavounidis |
| 2018/0242015 A1 | 8/2018 | Katsavounidis |
| 2018/0302456 A1 | 10/2018 | Katsavounidis et al. |
| 2018/0343458 A1 | 11/2018 | Katsavounidis et al. |
| 2019/0028529 A1 | 1/2019 | Katsavounidis |
| 2019/0028745 A1 | 1/2019 | Katsavounidis |

OTHER PUBLICATIONS

International Search Report for application No. PCT/US2018/019576 dated May 4, 2018.

Westerink et al., "An Optimal Bit Allocation Algorithm for Sub-Band Coding", ICASSP-88., International Conference on Acoustics, Speech, and Signal Processing, Apr. 11-14, 1988, pp. 757-760.

Riskin, Eve A., "Optimal Bit Allocation via the Generalized BFOS Algorithm", IEEE Transactions on Information Theory, Mar. 1, 1991, vol. 37, No. 2, pp. 400-402.

Yu et al., "Efficient Rate Control for JPEG-2000", IEEE Transactions on Circuits and Systems for Video Technology, May 1, 2006, vol. 16, No. 5, pp. 577-589.

Wu et al., "Rate-Constrained Picture-Adaptive Quantization for JPEG Baseline Coders", IEEE International Conference on Acoustics, Speech, and Signal Processing, Apr. 27-30, 1993, pp. 389-392.

Sermadevi et al., "Efficient Bit Allocation for Dependent Video Coding", DCC '04 Proceedings of the Conference on Data Compression, Mar. 23, 2004, 6 pages.

Ramchandran et al., "Bit Allocation for Dependent Quantization with Applications to Multiresolution and MPEG Video Coders", IEEE Transactions on Image Processing, Sep. 1994, vol. 3, No. 5, pp. 533-545.

Ortega et al., "Rate-Distortion Methods for Image and Video Compression", IEEE Signal Processing Magazine, Nov. 1998, vol. 15, No. 6, pp. 23-50.

T. Wiegand, G. J. Sullivan, G. Bjøntegaard, and A. Luthra, "Overview of the H.264/AVC Video Coding Standard," Circuits and Systems for Video Technology, IEEE Transactions on, vol. 13, No. 7, Jul. 2003, pp. 560-576, 2003.

L. Zhao, I. Katsavounidis, and C.-C. J. Kuo, "Another example of software replacing hardware: Real-time software MPEG-2 SDI/HD encoding for digital tv broadcasting," in NAB Broadcast Engineering Conference, 2003, pp. 37-40.

"The Netflix tech blog: High quality video encoding at scale," link: http://techblog.netflix.com/2015/12/high-quality-video-encoding-at-scale.html.

A. Ortega and K. Ramchandran, "Rate-distortion methods for image and video compression: An overview," IEEE Signal Processing Magazine, vol. 15, No. 6, pp. 23-50, 1998.

I. E. Richardson, H. 264 and MPEG-4 video compression: video coding for next-generation multimedia. John Wiley & Sons, 2004, 305 pages.

R. G. Keys, "Cubic convolution interpolation for digital image processing," IEEE Trans. on Acoustics, Speech, and Signal Processing, vol. ASSP-29, No. 6, pp. 1153-1160, 1981.

"Lanczos resampling," link: http://en.wikipedia.org/wiki/Lanczos resampling, 7 pages.

"The Netflix tech blog: Per-Title Encode Optimization," link: http://techblog.netflix.com/2015/12/per-title-encode-optimization.html, 17 pages.

I. Katsavounidis, A. Aaron, and D. Ronca, "Native resolution detection of video sequences," in SMPTE 2015 Annual Technical Conference and Exhibition. SMPTE, 2015, pp. 1-20.

(56) References Cited

OTHER PUBLICATIONS

"The Netflix tech blog: Toward a practical perceptual video quality metric," link: http://techblog.netflix.com/2016/06/toward-practical-perceptual-video.html, 27 pages.
"x264," link: https://en.wikipedia.org/wiki/X264, 5 pages.
S. Tavakoli, K. Brunnstrom, J. Gutierrez, and N. Garcia, "Quality of experience of adaptive video streaming: Investigation in service parameters and subjective quality assessment methodology," Signal Processing: Image Communication, vol. 39, pp. 432-443, 2015.
"Consumer Digital Video Library—El Fuente," link: http://www.cdvl.org/documents/ElFuente_summary.pdf, 64 pages.
G. J. Sullivan and T. Wiegand, "Rate-distortion optimization for video compression," IEEE signal processing magazine, vol. 15, No. 6, pp. 74-90, 1998.
T. Thiede, W. C. Treurniet, R. Bitto, C. Schmidmer, T. Sporer, J. G. Beerends, and C. Colomes, "Peaq-the ITU standard for objective measurement of perceived audio quality," Journal of the Audio Engineering Society, vol. 48, No. 1/2, pp. 3-29, 2000.
"Consumer Digital Video Library," link: http://www.cdvl.org, 1 page.
International Search Report for application No. PCT/US2018/042338 dated Oct. 29, 2018.
Non-Final Office Action received for U.S. Appl. No. 15/902,970 dated Mar. 30, 2020, 51 pages.
Notice of Allowance received for U.S. Appl. No. 16/016,432 dated Apr. 1, 2020, 30 pages.
Non-Final Office Action received for U.S. Appl. No. 16/054,621 dated Mar. 5, 2020, 40 pages.
Final Office Action received for U.S. Appl. No. 16/053,754 dated Mar. 18, 2020, 26 pages.
Notice of Allowance received for U.S. Appl. No. 15/902,975 dated Mar. 4, 2020, 28 pages.
Non-Final Office Action received for U.S. Appl. No. 15/902,970 dated Apr. 5, 2019, 59 pages.
Final Office Action received for U.S. Appl. No. 15/902,970 dated Oct. 31, 2019, 41 pages.
Non-Final Office Action received for U.S. Appl. No. 15/902,971 dated Oct. 31, 2019, 50 pages.
Non-Final Office Action received for U.S. Appl. No. 15/902,975 dated Aug. 22, 2019, 34 pages.
Non-Final Office Action received for U.S. Appl. No. 16/016,432 dated Sep. 13, 2019, 46 pages.
Non-Final Office Action received for U.S. Appl. No. 16/053,754 dated Aug. 21, 2019, 27 pages.
Non-Final Office Action received for U.S. Appl. No. 16/034,303 dated Jul. 10, 2019, 27 pages.
Notice of Allowance received for U.S. Appl. No. 16/034,303 dated Jan. 14, 2020, 24 pages.
Advisory Action received for U.S. Appl. No. 15/902,970 dated Feb. 10, 2020, 13 pages.
Final Office Action received for U.S. Appl. No. 15/902,971 dated Feb. 20, 2020, 45 pages.
Non-Final Office Action received for U.S. Appl. No. 16/054,621, dated Mar. 5, 2020, 35 pages.
Non-Final Office Action received for U.S. Appl. No. 15/902,971, dated Jul. 2, 2020, 36 pages.
Final Office Action received for U.S. Appl. No. 16/054,621, dated Aug. 25, 2020, 29 pages.
Non-Final Office Action received for U.S. Appl. No. 16/882,386, dated Oct. 9, 2020, 42 pages.
International Search Report for application No. PCT/US2020/046017 dated Oct. 12, 2020.
Tan et al., "Video Quality Evaluation Methodology and Verification Testing of HEVC Compression Performance", IEEE: Transactions on Circuits and Systems for Video Technology, XP011592174, DOI: 10.1109/TCSVT.2015.2477916, vol. 26, No. 1, Jan. 1, 2016, pp. 76-90.
Hanhart et al., "Calculation of average coding efficiency based on subjective quality scores", Journal of Visual Communication and Image Representation, Academic Press, XP028661468, http://dx.doi.org/10.1016/j.vcir.2013.11.008, vol. 25, No. 3, Dec. 4, 2013, pp. 555-564.

\* cited by examiner

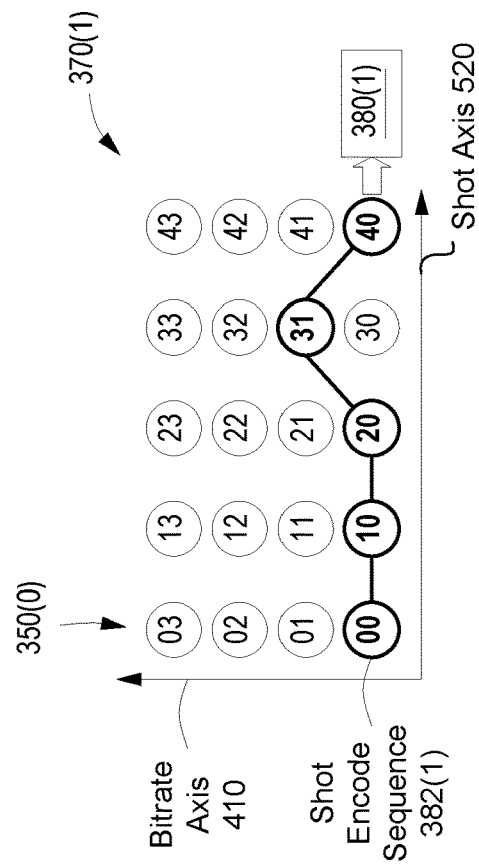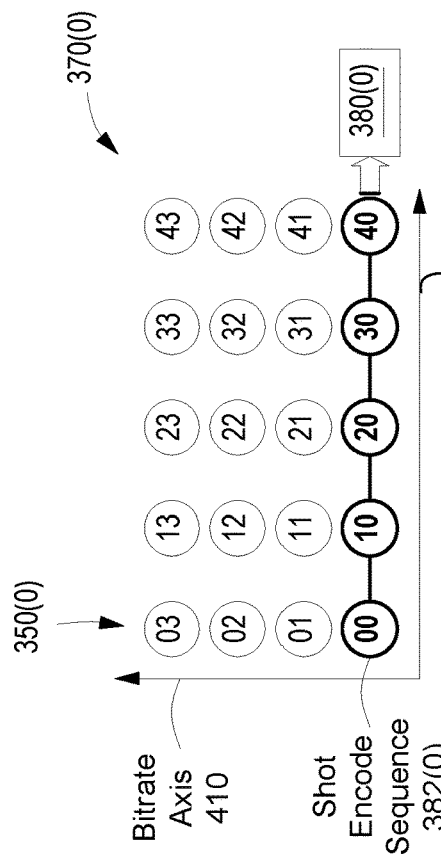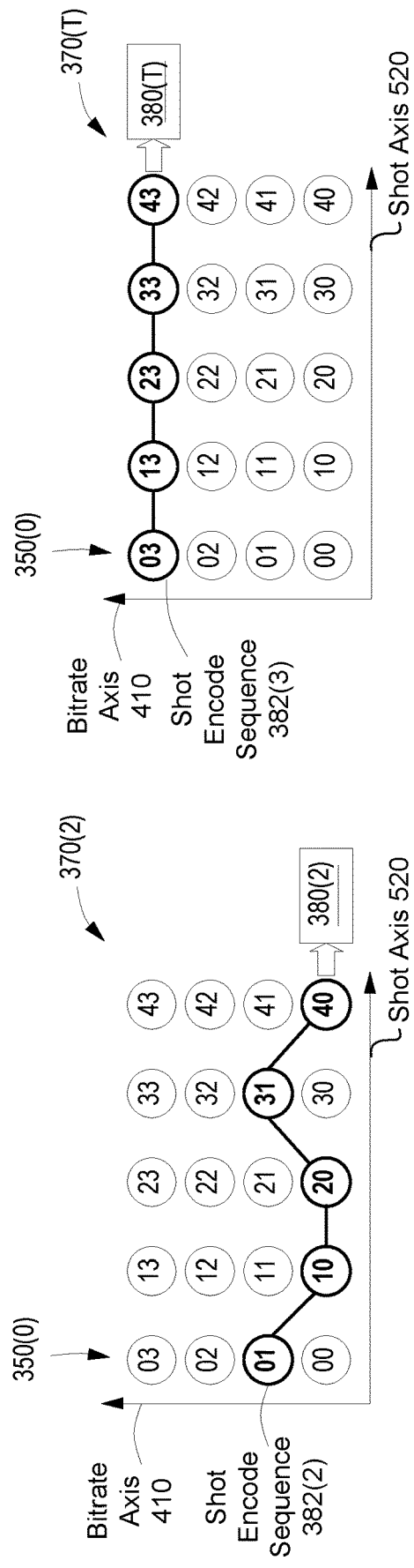
FIG. 5A  FIG. 5B  FIG. 5C  FIG. 5D

ITERATIVE TECHNIQUES FOR ENCODING VIDEO CONTENT

CROSS-REFERENCE TO RELATED APPLICATIONS

This application claims priority benefit of the U.S. Provisional Patent Application titled, "VIDEO ENCODING AT SCALE: PERCEPTUALLY OPTIMAL ENCODING OF VIDEO SEQUENCES", filed on Feb. 23, 2017 and having Ser. No. 62/462,873, this application also claims priority benefit to the U.S. Provisional Patent Application titled, "ENCODING TECHNIQUE FOR OPTIMIZING DISTORTION AND BITRATE", filed on Jul. 18, 2017 and having Ser. No. 62/534,170, this application also claims priority benefit to the U.S. Provisional Patent Application titled, "ENCODING TECHNIQUE FOR OPTIMIZING DISTORTION AND BITRATE", filed on Aug. 25, 2017 and having Ser. No. 62/550,517. The subject matter of these related applications is hereby incorporated herein by reference.

BACKGROUND

Field of the Various Embodiments

Embodiments of the present invention relate generally to video technology and, more specifically, to iterative techniques for encoding video content.

Description of the Related Art

A typical video streaming service provides access to a library of media titles that can be viewed on a range of different endpoint devices. Each endpoint device may connect to the video streaming service under different connection conditions. Some notable connection conditions include, without limitation, bandwidth and latency. In addition, each different endpoint device may include different hardware for outputting the media title to end user(s). For example, a given endpoint device could include a display screen having a particular screen size and a particular screen resolution.

In many implementations, an endpoint device that connects to a video streaming service executes an endpoint application that determines, for a given media title, an appropriate encoded version of the media title to stream to the endpoint device based on the connection conditions and the properties of the endpoint device. More specifically, the endpoint application attempts to select a particular encoded version of the media title that provides the best visual quality during playback of the media title on the endpoint device while avoiding playback interruptions due to buffering or rebuffering.

In some implementations, the endpoint application selects the particular encoded version of the media title based on a bitrate ladder. The bitrate ladder is designed to achieve a target visual quality during playback of a media title based on an available bitrate. Each rung in the bitrate ladder specifies a different bitrate-resolution pair corresponding to a different pre-generated encoded version of the media title. To generate the encoded version of a media title corresponding to a given bitrate-resolution pair, the video service provider samples the video content associated with the media title at the resolution to generate sampled video content. The video service provider then encodes the sampled video content based on encoding parameters associated with the bitrate.

One drawback of the above encoding technique is that the complexity of the video content associated with a given media title oftentimes varies across the media title, but the resolution and encoding parameters used to encode the video content do not vary. As a result, encoding relatively simple portions of the media title may consume more computational and storage resources than are necessary to meet the target visual quality. For example, a relatively simple portion of a media title could have the same visual quality regardless of whether that portion of video content is encoded using a bitrate of 8 megabits per second or encoded using a bitrate of 20 megabits per second. Such encoding inefficiencies not only needlessly waste computational and storage resources, these types of inefficiencies also unnecessarily increase the bandwidth required to stream encoded versions of media titles to endpoint devices.

As the foregoing illustrates, what is needed in the art are more effective techniques for encoding video content for streaming.

SUMMARY

One embodiment of the present invention sets forth a computer-implemented method for encoding source video sequences. The method includes generating a first set of shot encode points based on a first set of encoding points and a first shot sequence included in a source video sequence that is associated with a media title, where each shot encode point is associated with a different encoded shot sequence; performing one or more convex hull operations across the first set of shot encode points to generate a first convex hull that is associated with the first shot sequence; generating encoded video sequences based on the first convex hull and a second convex hull that is associated with a second shot sequence included in the source video sequence; computing a first encoding point that is not included in the first set of encoding points based on the encoded video sequences and a target value for a first video metric; and generating an optimized encoded video sequence based on the first encoding point, where at least a portion of the optimized encoded video sequence is subsequently streamed to an endpoint device during a playback of the media title.

At least one technological improvement of the disclosed techniques relative to prior art is that iteratively converging to an optimized set of individually encoded shot sequences reduces the encoding inefficiencies typically associated with conventional encoding techniques. In particular, because each shot sequence is encoded based on a resolution and encoding parameter(s) that are optimized for the shot sequence, the encoded video sequence can be streamed to endpoint devices with an increased visual quality for a target bitrate. Conversely, the encoded video sequence can be streamed to endpoint devices with a reduced bitrate for a target visual quality.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIGS. 5A-5D illustrate in greater detail how the trellis iterator of FIG. 3 assembles encoded shot sequences into encoded video sequences, according to various embodiments of the present invention;

DETAILED DESCRIPTION

Figure 1:
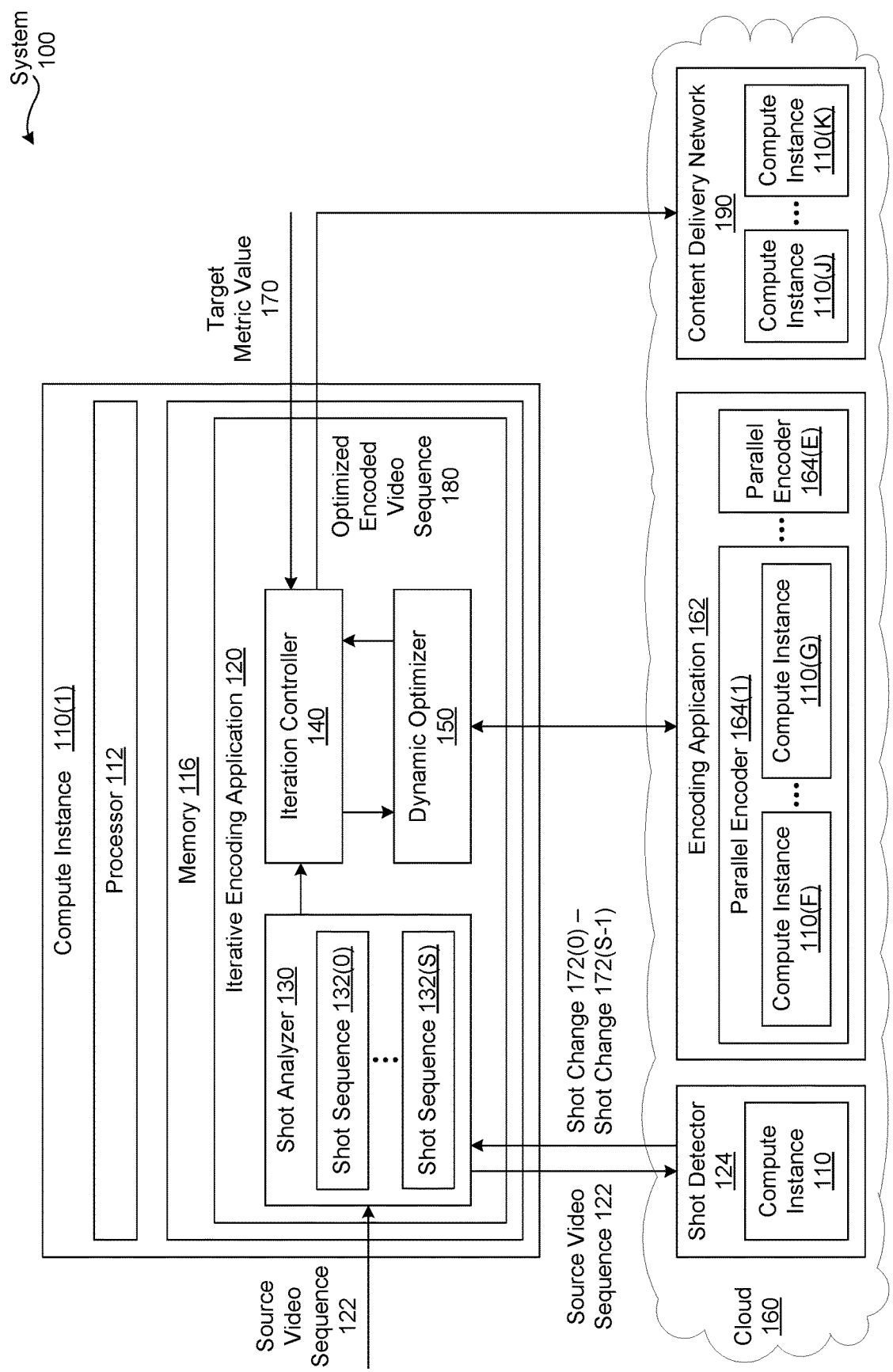
FIG. 1 is a conceptual illustration of a system configured to implement one or more aspects of the present invention.

In the following description, numerous specific details are set forth to provide a more thorough understanding of the various embodiments. However, it will be apparent to one of skilled in the art that the inventive concepts may be practiced without one or more of these specific details.

The disclosed techniques generate an optimized encoded video sequence based on a target metric value (e.g., a bitrate or a quality score). For each shot sequence included in a source video sequence, an iteration controller initializes an encoding list to include relatively sparsely distributed encoding points. Each encoding point specifies a resolution and a quantization parameter (QP). The iteration controller then configures a dynamic optimizer to generate a global convex hull based on the encoding lists.

The dynamic optimizer generates new shot encode points based on the new encoding points included in the encoding lists. A "new" encoding point is an encoding point for which the dynamic optimizer has not previous generated an associated encoded shot sequence. As part of generating a given shot encode point, the dynamic optimizer generates and analyzes an associated encoded shot sequence. Subsequently, for each shot sequence, the dynamic optimizer generates a convex hull that includes a subset of the shot encode points associated with the shot sequence. In general, for a given shot sequence, the shot encode points included in the associated convex hull minimize the bitrate for different distortion levels.

The dynamic optimizer then evaluates the convex hulls across all of the shot sequences to identify multiple shot encode sequences, where each shot encode sequence specifies a sequence of shot encode points. For each shot encode sequence, the dynamic optimizer aggregates the different encoded shot sequences associated with the shot encode points to generate an encoded video sequence. The dynamic optimizer generates a global convex hull based on the shot encode sequences. In general, each point included in the global convex hull is associated with a different shot encode sequence that minimizes the overall bitrate for a different overall distortion level.

The iteration controller selects an optimized shot encode sequence based on the global convex hull and a target metric value (e.g., bitrate or quality score). For each shot sequence, the optimized shot encode sequence specifies an optimized shot encode point. For each shot sequence, the iteration controller evaluates the location of the optimized shot encode point along the associated convex hull to identify one or more nearby shot encodes. Based on the resolutions and the QP values of the optimized shot encode point and the nearby shot encode points, the iteration controller may generate any number of new encoding points for the shot sequence. If, the iteration controller identifies any new encoding points, then the iteration controller configures the dynamic optimizer to generate a new global convex hull based on the expanded set of encoding points.

If, however, the iteration controller does not identify any new encoding points, then the iteration controller selects the encoded video sequence included in optimized video encode point as the optimized encoded video sequence. Finally, the iteration controller transmits the optimized encoded video sequence to a content delivery network for distribution to endpoint devices.

One advantage and technological advancement of the disclosed techniques is that portions of the source video sequence needing specific encoding points to meet a target bitrate or target quality score are encoded at those encoding points. Further, other portions of the source video sequence are encoded at other appropriately chosen encoding points. Encoding each shot sequence at encoding points that are optimized for the shot sequence reduces the encoding inefficiencies typically associated with conventional encoding techniques.

System Overview

FIG. 1 is a conceptual illustration of a system 100 configured to implement one or more aspects of the present invention. As shown, the system 100 includes, without limitation, any number of compute instances 110 and a cloud 160. In general, the cloud 160 contains encapsulated shared resources, software, data, etc. For explanatory purposes, multiple instances of like objects are denoted with reference numbers identifying the object and parenthetical numbers identifying the instance where needed.

Any number of the compute instances 110 may reside outside the cloud 160 while other compute instances 110 may reside inside the cloud 160. In various embodiments, any number of the components of the system 100 may be distributed across multiple geographic locations. Further, any number of the components of the system 100 may be included in or distributed across one or more stand-alone devices, distributed computing environments, or clouds 160 in any combination.

As shown, each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instances 110 are configured to implement one or more applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications may be consolidated into a single application or subsystem.

In particular, the compute instances 110 are configured to generate an optimized encoded video sequence 180 for the source video sequence 122. The source video sequence 122 includes, without limitation, any amount and type of video content that is associated with a media title. Examples of video content include, without limitation, any portion (including all) of feature length films, episodes of television programs, and music videos, to name a few. The optimized encoded video sequence 180 includes, without limitation, encoded video content derived from the video content included in the source video sequence 122.

Although not shown, a video streaming service provides access to a library of media titles that can be viewed on a range of different endpoint devices. The library of media titles includes without limitation, the media title associated with the source video sequence 122. Each endpoint device may connect to the video streaming service under different connection conditions. Some notable connection conditions include, without limitation, bandwidth and latency. In addition, each different endpoint device may include different hardware for outputting the media title to end user(s). For example, a given endpoint device could include a display screen having a particular screen size and a particular screen resolution.

In many implementations, an endpoint device that connects to a video streaming service executes an endpoint application that determines, for a given media title, an appropriate encoded version of the media title to stream to the endpoint device based on the connection conditions and the properties of the endpoint device. More specifically, the endpoint application attempts to select a particular encoded version of the media title that provides the best visual quality during playback of the media title on the endpoint device while avoiding playback interruptions due to buffering or rebuffering.

In some conventional implementations, the endpoint application selects the particular encoded version of the media title based on a bitrate ladder. The bitrate ladder is designed to achieve a target visual quality during playback of a media title based on an available bitrate. Each rung in the bitrate ladder specifies a different bitrate-resolution pair corresponding to a different pre-generated encoded version of the media title. To generate the encoded version of a media title corresponding to a given bitrate-resolution pair, the video service provider samples the video content associated with the media title at the resolution to generate sampled video content. The video service provider then encodes the sampled video content based on encoding parameters associated with the bitrate.

One drawback of the above conventional encoding technique is that the complexity of the video content associated with a given media title oftentimes varies across the media title, but the resolution and encoding parameters used to encode the video content do not vary. As a result, encoding relatively simple portions of the media title may consume more computational and storage resources than are necessary to meet the target visual quality. For example, a relatively simple portion of a media title could have the same visual quality regardless of whether that portion of video content is encoded using a bitrate of 8 megabits per second or encoded using a bitrate of 20 megabits per second. Such encoding inefficiencies not only needlessly waste computational and storage resources, these types of inefficiencies also unnecessarily increase the bandwidth required to stream encoded versions of media titles to endpoint devices.

Optimizing Encoding Operations for Individual Shot Sequences

To address the above problems, the system 100 includes, without limitation, an iterative encoding application 120 that optimizes the resolution and encoding parameters for each shot sequence 132 included in the source video sequence 122. The source video sequence 122 includes, without limitation, any number of contiguous and non-overlapping shot sequences 132. Each of the shot sequences 132 includes a set of frames that usually have similar spatial-temporal properties and run for an uninterrupted period of time. The iterative encoding application 120 resides in one of the memories 116 and executes on one of the processors 112.

As shown, the iterative encoding application 120 includes, without limitation, a shot analyzer 130, an iteration controller 140, and a dynamic optimizer 150. Upon receiving the source video sequence 122, the shot analyzer 130 determines one or more shot changes 172 included in the source video sequence 122. Each of the shot changes 172 specifies a boundary between a different pair of the shot sequences 132. The shot analyzer 130 may determine the one or more shot changes 172 in any technically feasible fashion.

For instance, in some embodiments, the shot analyzer 130 transmits the source video sequence 122 to a shot detector 170 that resides in the cloud 160. To determine the shot changes 172, the shot detector 170 executes any number of shot detection algorithms based on the source video sequence 122. Some examples of shot detection algorithms include, without limitation, a multi-scale sum-of-absolute-differences algorithm, a motion-compensated residual energy algorithm, a histogram of differences algorithm, a difference of histograms algorithm, and so forth. The shot detector 170 then transmits the shot changes 172 to the shot analyzer 130. In alternate embodiments, the shot analyzer 130 may perform any number of shot detection operations on the source video sequence 122 to determine the shot changes 172.

The shot analyzer 130 performs partitioning operations on the source video sequence 122 based on the shot changes 172 to determine the shot sequences 132. In some embodiments, the shot analyzer 130 may also remove extraneous pixels from the source video sequence 122. For example, the shot analyzer 130 could remove pixels included in black bars along border sections of the source video sequence 122.

In various embodiments, the iterative encoding application 120 ensures that the initial frame of each shot sequence 132 is encoded as a key frame during encoding operations. As a general matter, a "key frame" and all subsequent frames from the same shot sequence 132 that are included in an encoded video sequence are decoded independently of any proceeding frames included the encoded video sequence.

The iterative encoding application 120 may ensure that the different initial frames of the different shot sequences 132 are encoded as key frames in any technically feasible fashion. For instance, in some embodiments, the dynamic optimizer 150 configures an encoding application 160 to encode frames as key frames based on a key frame location list (not shown in FIG. 1) when encoding video content. In other embodiments, the dynamic optimizer 150 may perform any number of encoding operations to encode the different initial frames of the different shot sequences 132 as key frames when encoding video content.

As persons skilled in the art will recognize, during playback, the media title associated with the source video sequence 122 is switchable between decoded versions of different encoded video sequences 180 at aligned key frames to optimize a viewing experience based on any number of relevant criteria. Examples of relevant criteria include the current connection bandwidth, the current connection latency, the content of the upcoming shot sequence 132, and the like.

Upon receiving the shot sequences 132, the iteration controller 140 generates an optimized encoded video sequence 180 based on a target metric value 170. For each of the shot sequences 132, the optimized encoded video sequence 180 includes, without limitation, an encoded shot sequence (not shown in FIG. 1) that is associated with the shot sequence 132. Each of the encoded shot sequences includes encoded video content derived from the video content included in the associated shot sequence 132.

The target metric value 170 is a value for a metric that corresponds to one or more properties of encoded video content. In some embodiments, the target metric value 170 is a bitrate. In other embodiments, the target metric value 170 is a quality score of a visual quality metric. Example of visual quality metrics include, without limitation, a peak signal-to-noise-ratio PSNR), a linear video multimethod assessment fusion ((VMAF) metric, and a harmonic VMAF (VMAFh), to name a few.

In operation, the iteration controller 140 generates the optimized encoded video sequence 180 in an iterative process that individually optimizes each of the encoded shot sequences included in the optimized encoded video sequence 180. As described in greater detail in conjunction with FIG. 2, for each shot sequence 132, the iteration controller 140 initializes a different encoding list (not shown in FIG. 1) to include relatively sparsely distributed encoding points. In general, each encoding list may specify any number of encoding points and the number of encoding points in the encoding list may differ from the number of encoding points in other encoding lists. Each encoding point specifies a resolution and one or more encoding parameters.

Subsequently, as described in greater detail in conjunction with FIGS. 3-6, the iteration controller 140 configures the dynamic optimizer 150 to generate a global convex hull based on the encoding lists. First, the dynamic optimizer 150 evaluates the encoding lists to identify new encoding points. For each encoding list, a "new" encoding point is an encoding point for which the dynamic optimizer 150 has not previously generated an encoded shot sequence based on the associated shot sequence 132. For each new encoding point, the dynamic optimizer 150 generates an encoded shot sequence.

The dynamic optimizer 150 may generate the encoded shot sequences in any technically feasible fashion. Further, as a general matter, the dynamic optimizer 150 may generate encoded video content derived from video content based on a given resolution and given encoding parameters in any technically feasible fashion. For instance, in some embodiments, the dynamic optimizer 150 performs sampling operations on the video content based on the resolution to generate sampled video content. Subsequently, the dynamic optimizer 150 configures the encoding application 162 to perform encoding operations on the sampled video content based on the encoding parameters to generate the encoded shot sequence.

As shown, the encoding application 162 resides in the cloud 160 and is configured to efficiently perform encoding operations via one or more parallel encoders 164. Each of the parallel encoders 164 may include any number of computer instances 110. In alternate embodiments, the dynamic optimizer 150 may perform encoding operations and the system 100 may omit the encoding application 162. In the same or other embodiments, the system 100 may include a sampling application, and the dynamic optimizer 150 may configure the sampling application to perform sampling operations.

The dynamic optimizer 150 may perform sampling operations and encoding operations at any level of granularity (e.g., per frame, per shot sequence, per video sequence, etc.) in any combination and in any technically feasible fashion. For instance, in some embodiments, the dynamic optimizer 150 may perform sampling operations on the source video sequence 122 based on given resolution to generate a sampled video sequence. Subsequently, for each encoding point associated with the resolution, the dynamic optimizer 150 may configure the encoding application 162 to encode the sampled video content corresponding to associated shot sequence 132 based on the associated encoding parameters.

After generating a new encoded shot sequence, the dynamic optimizer 150 computes a bitrate, a quality score, and a distortion level based on the encoded shot sequence. The dynamic optimizer 150 may compute the bitrate, the quality score, and the distortion level in any technically feasible fashion. For each new encoded shot sequence, the dynamic optimizer 150 generates a shot encode point (not shown in FIG. 1) that includes the encoded shot sequence, the resolution, the encoding parameters, the bitrate, the quality score, and the distortion level. For each of the shot sequences 132, the dynamic optimizer 150 generates a different convex hull. The convex hull associated with a given shot sequence 132 includes any number of the shot encode points associated with the shot sequence 132. In general, for a given shot sequence 132, the shot encode points included in the associated convex hull minimize the bitrate for different distortion levels.

The dynamic optimizer 150 then evaluates the convex hulls across all of the shot sequences 132 to determine shot encode sequences (not shown in FIG. 1). Each shot encode sequence specifies shot encode points for the different shot sequences 132. For each shot encode sequence, the dynamic optimizer 150 aggregates the different encoded shot sequences included in the shot encode points to generate an encoded video sequence. For each shot encode sequence, the dynamic optimizer 150 then generates a video encode point that includes the shot encode sequence, the associated encoded video sequence, an overall bitrate for the encoded shot sequence, and an overall distortion level for the encoded shot sequence. Subsequently, the dynamic optimizer 150 generates a global convex hull based on the video encode points. In general, for the source video sequence 122, each of the video encode points included in the global convex hull minimizes the overall bitrate for a different overall distortion level.

The iteration controller 140 then selects an optimized video encode point that is included in the global convex hull based on the target metric value 170. For each shot sequence 132, the iteration controller 140 identifies an optimized shot encode point based on the optimized video encode point. Subsequently, for each shot sequence 132, the iteration controller 140 identifies any number (including zero) of new encoding points based on the associated optimized shot encode point and the convex hull associated with the shot sequence 132(x).

More specifically, for a given shot sequence 132, the iteration controller 140 performs any number and type of search operations on the convex hull associated with the shot sequence 132 based on the optimized shot encode point associated with the shot sequence 132. If the iteration controller 140 identifies any new encoding points, then the iteration controller 140 adds the encoding point(s) to the appropriate encoding list. The iteration controller 140 then configures the dynamic optimizer 150 to generate a new global convex hull based on the expanded encoding lists.

If, however, the iteration controller 140 does not identify any new encoding points, then the iteration controller 140 determines that the iteration controller 140 has successively converged with respect to the target metric value 170. The iteration controller 140 selects the encoded video sequence included in optimized video encode point as the optimized encoded video sequence 180. Finally, the iteration controller 140 transmits the optimized encoded video sequence 180 to a content delivery network (CDN) 190 for distribution to endpoint devices.

Note that the techniques described herein are illustrative rather than restrictive, and may be altered without departing from the broader spirit and scope of the invention. Many modifications and variations on the functionality provided by the iterative encoding application 120, the shot analyzer 130, the iteration controller 140, the dynamic optimizer 150, the shot detector 170, the encoding application 162, and the content delivery network 190 will be apparent to those of ordinary skill in the art without departing from the scope and spirit of the described embodiments. For instance, in various embodiments, one or more of the iterative encoding application 120, the shot analyzer 130, the iteration controller 140, the dynamic optimizer 150, and the encoding application 162 may be configured to identify and operate on sets of frames for which a consistency metric lies within a specified range instead of the shot sequences 132.

In some alternate embodiments, the iterative encoding application 120, the shot analyzer 130, and/or the shot detector 170 may be configured to partition the source video sequence 132 into frame sets that are not necessarily equivalent to the shot sequences 132. The iterative encoding application 120, the shot analyzer 130, and/or the shot detector 170 may be configured to partition the source video sequence 132 into the frame sets in any technically feasible fashion. A frame set may represent a variety of different constructs, including a group of pictures (GOP), a sequence of frames, a plurality of sequences of frames, and so forth. In a complementary fashion, the iterative encoding application 120, the iteration controller 140, the dynamic optimizer 150, the encoding application 162, and the content delivery network 190 may be configured to operate on frame sets and encoded frame sets instead of the shot sequences 132 and encoded shot sequences.

As persons skilled in the art will recognize, the techniques described herein may be modified to optimize audio encoding instead of video encoding. For example, in some embodiments, an audio track may be partitioned into "audio scenes." The audio scenes may be sampled via audio rendering hardware. The sampled audio scenes may be encoded via an audio codec that is configured via a quantization parameter and/or bitrate settings. The quality scores of the encoded audio scenes may be computed via a Perceptual Evaluation of Audio Quality (PEAQ) algorithm. Notably, the resolution and/or any number of encoding parameters may be optimized for each audio scene based on any of the techniques described herein in any combination.

It will be appreciated that the system 100 shown herein is illustrative and that variations and modifications are possible. For example the functionality provided by the iterative encoding application 120, the shot analyzer 130, the iteration controller 140, the dynamic optimizer 150, the shot detector 170, the encoding application 162, and the content delivery network 190 as described herein may be integrated into or distributed across any number of software applications (including one), hardware devices (e.g., a hardware-based encoder), and any number of components of the system 100. Further, the connection topology between the various units in FIG. 1 may be modified as desired.

Figure 2:
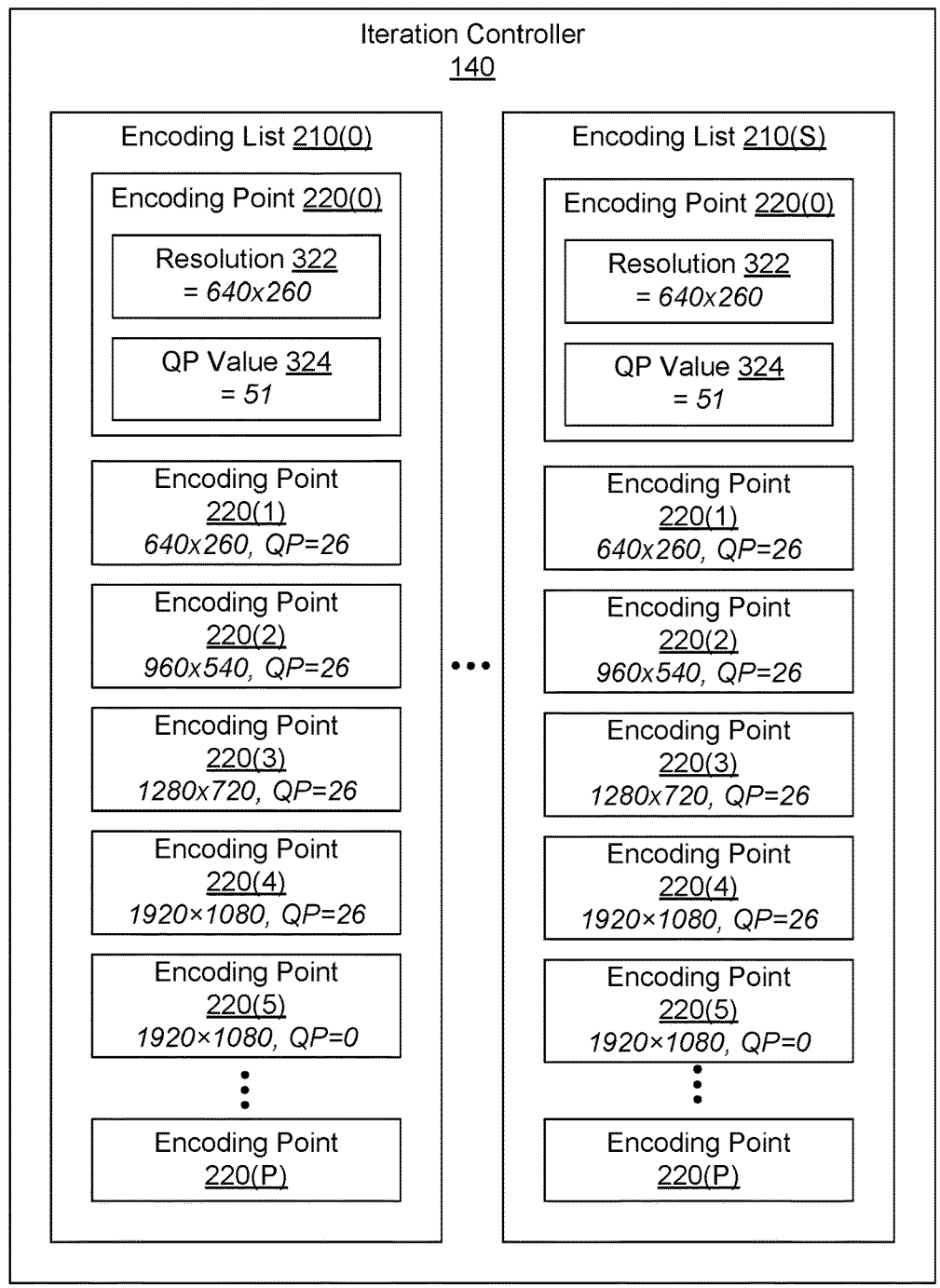
FIG. 2 is a more detailed illustration of the iteration controller of FIG. 1, according to various embodiments of the present invention.

FIG. 2 is a more detailed illustration of the iteration controller 140 of FIG. 1, according to various embodiments of the present invention. As shown, the iteration controller 140 includes, without limitation, S+1 encoding lists 210, where S+1 is the total number of the shot sequences 132. Further, each of the encoding lists 210 includes any number of encoding points 120. Each encoding point 120 includes, without limitation, a bitrate 332 and a quantization parameter (QP) value 324.

The quantization parameter allows a monotonic performance in terms of bitrate and distortion when encoding a video content. The higher the QP value, the lower the resulting bitrate at the expense of lower quality. However, in alternate embodiments, each of the encoding points 120 may include any number and type of encoding parameters instead of or in addition to the QP value 324.

Initially, for each shot sequence 132(x), the iteration controller 140 generates the encoding list 210(x) that includes a relatively sparse selection of encoding points 220. The iteration controller 140 may generate the initial encoding lists 210 in any technically feasible fashion. For instance, in some embodiments the iteration controller 140 initializes the encoding lists 210 based on a fixed set of resolutions and the codec implemented by the iterative encoding application 120.

More specifically, for each encoding list 210, the iteration controller 210 generates the encoding point 220(0) specifying a minimum resolution and the maximum QP value allowed by the video codex. The iteration controller 210 then generates the encoding point 220(1) specifying the minimum resolution and the middle QP value allowed by the video codex. For each additional resolution that lies in between the maximum resolution and the minimum resolution, the iteration controller 210 generates the encoding point 220 specifying the resolution and the middle QP value. The iteration controller 210 then generates the encoding point 220 specifying the maximum resolution and the middle QP value. Finally, the iteration controller 210 generates the encoding point 220 specifying the maximum resolution and the minimum QP value allowed by the video codec.

For explanatory purposes only, example resolutions and values for the first five points included in each of the encoding lists 210 are depicted in italics. As shown, the encoding point 220(0) specifies the resolution 322 of 640×260 and the QP value 324 of 1920×1080 and the QP value 324 of 0, the encoding point 220(1) specifies the resolution 322 of 640×260 and the QP value 324 of 26, the encoding point 220(2) specifies the resolution 322 of 960×520 and the QP value 324 of 26, the encoding point 220(3) specifies the resolution 322 of 1280×720 and the QP value 324 of 26, the encoding point 220(4) specifies the resolution 322 of 1920×1080 and the QP value 324 of 26, and the encoding point 220(5) specifies the resolution 322 of 1920×1080 and the QP value 324 of 0.

Figure 7:
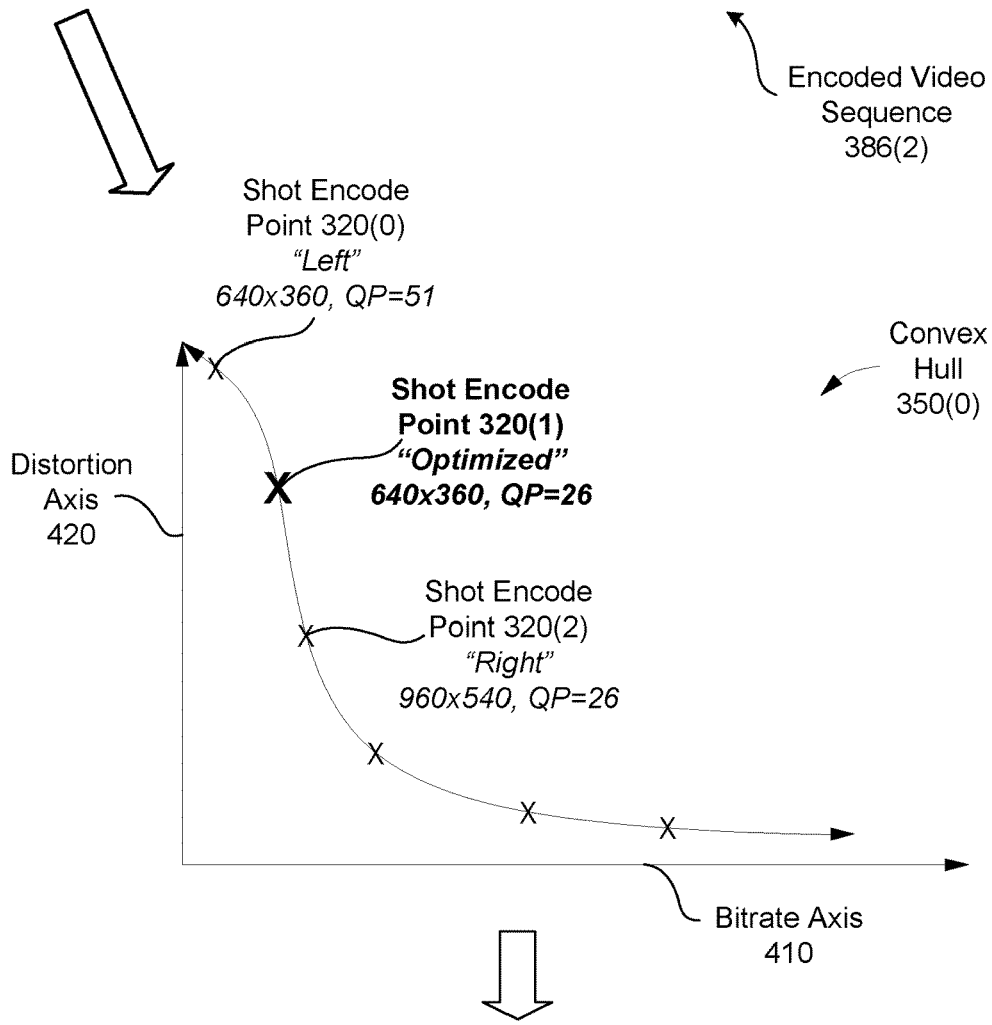
FIG. 7 illustrates how the iteration controller of FIG. 1 generates additional encoding points for a shot sequence, according to various embodiments of the present invention.

As described in greater detail in conjunction with FIG. 7, after the dynamic optimizer 150 generates a new global convex hull, the iteration controller 140 may update any number of the encoding lists 120. Notably, the iteration controller 140 independently evaluates each shot sequence 132(x) to determine any number of new encoding points 220 to add to the encoding lists 210(x). As a result, at any given time, the number of encoding points 220 included in the encoding list 210(x) may vary from the number of encoding points 220 included in any of the other encoding lists 210. In general, the iteration controller 140 iteratively refines the range of encoding points 220 in order to efficiently converge to the optimized encoded video sequence 180 that best matches the target metric value 170.

Generating Different Encoded Video Sequences

Figure 3:
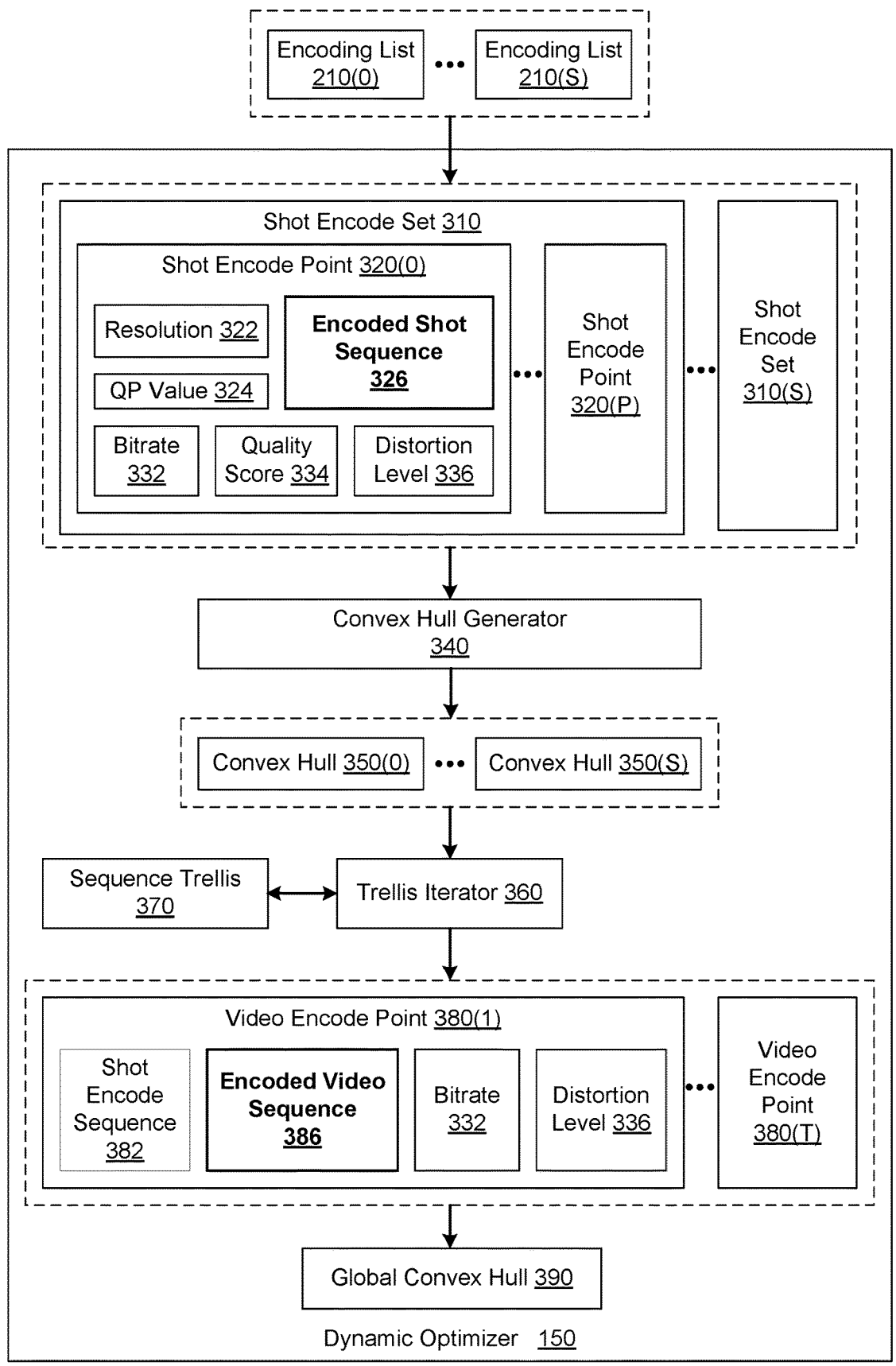
FIG. 3 is a more detailed illustration of the dynamic optimizer of FIG. 1, according to various embodiments of the present invention.

FIG. 3 is a more detailed illustration of the dynamic optimizer 150 of FIG. 1, according to various embodiments of the present invention. As shown, the dynamic optimizer 150 includes, without limitation, shot encode sets 310, a convex hull generator 340, convex hulls 350, a trellis iterator 360, a sequence trellis 370, any number of video encode points 380, and a global convex hull 390. The total number of the shot encode sets 310 equals the number of shot sequences 132. Similarly, the total number of the convex hulls 340 equals the number of shot sequences 132. In general, the shot sequence 132(x) is associated with both the shot encode set 310(x) and the convex hull 340(x).

Each of the shot encode sets 310 includes, without limitation, any number of shot encode points 320. The number of shot encode points 320 included in the shot encode set 310(x) may differ from the number of shot encode points 320 included in any of the other shot encode sets 310. Each of the shot encode points 320 includes, without limitation, the resolution 322, the QP value 324, an encoded shot sequence 326, a bitrate 332, any number of quality scores 334, and a distortion level 336. In alternate embodiments, the shot encode point 320 may include any number and type of encoding parameters instead of or in addition to the QP value 324.

When the dynamic optimizer 150 initially receives the encoding lists 210(0)-210(S) from the iteration controller 140, the dynamic optimizer 150 generates the shot encode sets 310(0)-310(S). For each encoding point 220(y) included in each encoding list 210(x), the dynamic optimizer 150 generates a corresponding shot encode point 320(y) and adds the shot encode point 320(y) to the shot encode set 310(x). More specifically, the dynamic optimizer 150 generates a new encoded shot sequence 326 based on the shot sequence 132(x), the resolution 322 and the QP value 324 specified in the encoding point 220(y).

The dynamic optimizer 150 then computes the bitrate 332, the quality score 334, and the distortion level 336 associated with the encoded shot sequence 326. The dynamic optimizer 150 then generates the shot encode point 320(y) that includes, without limitation, the encoded shot sequence 326 as well as the resolution 322, the QP value 324, the bitrate 332, the quality score 334, and the distortion level 336 associated with the encoded shot sequence 326. Finally, the dynamic optimizer 150 includes the new shot encode point 320(y) in the shot encode set 310(x).

Subsequently, upon receiving one or more updated encoding lists 210, the dynamic optimizer 150 identifies any "new" encoding points 220. In operation, for the encoding list 210(x), the dynamic optimizer 150 determines which (if any) of the encoding points 220 are not represented by the shot encode set 310(x). For each new encoding point 220(y) included in the encoding list 210(x), the dynamic optimizer 150 generates a corresponding shot encode point 320(y) and adds the new shot encode point 320(y) to the shot encode set 310(x).

In general, the dynamic optimizer 150 may generate the encoded shot sequence 326 and determine the associated quality score 334, associated bitrate 332, and the associated distortion level 336 in any technically feasible fashion. To generate the encoded shot sequence 326, in some embodiments, the dynamic optimizer 150 performs sampling operations on the video content based on the resolution 322 to generate sampled video content. Subsequently, the dynamic optimizer 150 configures the encoding application 162 to perform encoding operations on the sampled video content based on the QP 324 to generate the encoded shot sequence 326. The dynamic optimizer 150 may generate the encoded shot sequence 326 based on any technically feasible encoding algorithm(s) in any technically feasible fashion. Examples of encoding algorithms include advanced video coding (AVC), and high-efficiency video encoding (HEVC), to name a few.

In some embodiments, to determine the quality score 334 associated with the encoded shot sequence 326, the dynamic optimizer 150 decodes the encoded shot sequence 326 to generate a decoded shot sequence. The dynamic optimizer 150 then re-samples (i.e., up-samples or down-samples) the decoded shot sequence to a target resolution to generate a re-constructed shot sequence that is relevant to the display characteristics of a class of endpoint devices.

In alternate embodiments, the dynamic optimizer 150 may compute any number of quality scores 334 for any number or resolutions. For example, a certain video may be delivered in 3840×2160 resolution, yet be intended to be consumed by a large number of displays in 1920×1080 resolution. Another class of endpoint devices, for example laptop computers, is expected to display the same video in 1280×720 resolution. Yet another class of endpoint devices, for example, tablet or smartphone devices, is expected to display the same video in 960×540 resolution. The dynamic optimizer 150 could up-sample the decoded shot sequence to all these target resolutions in order to assess quality, when considering one of these different classes of endpoint devices, correspondingly.

The dynamic optimizer 150 then analyzes the re-constructed shot sequence to generate the quality score 334 for an objective quality metric (QM). For instance, in some embodiments the dynamic optimizer 150 implements a VMAF (or harmonic VMAF) algorithm to generate a VMAF score for each encoded shot sequence 326 based on the associated re-constructed shot sequence. Although a multitude of video quality metrics, such as VMAF scores, can be calculated at different target resolutions, it should be clear that, when comparing qualities among encoded shot sequences 385 associated with different resolutions 332, applications need to use the same target resolution for re-sampling, after decoding. For instance, in some embodiments, the dynamic optimizer 150 re-samples the decoded shot sequence to 1920×1080 to generate the re-constructed shot sequence for each encoded shot sequence 326. Subsequently the dynamic optimizer computes the quality score 334 for the encoded shot sequence 326 based on the associated re-constructed shot sequence.

The dynamic optimizer 150 may generate the bitrate 332 based on the resolution 334 in any technically feasible fashion. For instance, in some embodiments, the dynamic optimizer 150 may divide the total number of bits needed for the resolution 334 by the length of the associated shot sequence 132. In the same or other embodiments, the dynamic optimizer 150 may compute the distortion level 336 based on the quality score 334 and any technically feasible technique for converting quality to distortion. For example, the dynamic optimizer 150 could invert the quality score 334 to determine the distortion level 336. In another example, the dynamic optimizer 150 could subtract the quality score 334 from a constant value to determine the distortion level 336.

For each of the shot sequences 132($x$), the convex hull generator 340 generates a convex hull 350($x$) based on the shot encode set 310($x$). Each of the convex hulls 350($x$) includes, without limitation, the shot encode points 320 included in the shot encode set 3109$x$) that maximize bitrate for a given level of distortion. A detailed example of how the convex hull generator 340 generates the convex hull 350(0) based on the shot encode set 310(0) is described in conjunction with FIG. 4.

As shown, and as described in detail in conjunction with FIG. 5, the trellis iterator 360 receives the convex hulls 350 and then iteratively updates a sequence trellis 370 to generate any number of video encode points 380. The trellis iterator 360 is a software module, and the sequence trellis 370 is a data structure that is described in greater detail below in conjunction with FIGS. 5A-5D.

Each of the video encode points 380 includes, without limitation, a shot encode sequence 382, an encoded video sequence 382, the bitrate 332, and the distortion level 334. The shot encode sequence 382 includes, without limitation, S+1 shot encode points 320—a different shot encode point 320 for each of the shot sequences 132. The encoded video sequence 382 includes, without limitation, the S+1 encoded shot sequences 326 included in the S+1 shot encode points 320 included in the shot encode sequence 382. The bitrate 332 and the distortion level 334 specify, respectively, a global bitrate and a global distortion level for the encoded video sequence 283. As described in greater detail in conjunction with FIGS. 5A-5D, the trellis iterator 360 generates the video encode points and, subsequently, generates the global convex hull 390 based on the video encode points 360.

Figure 4:
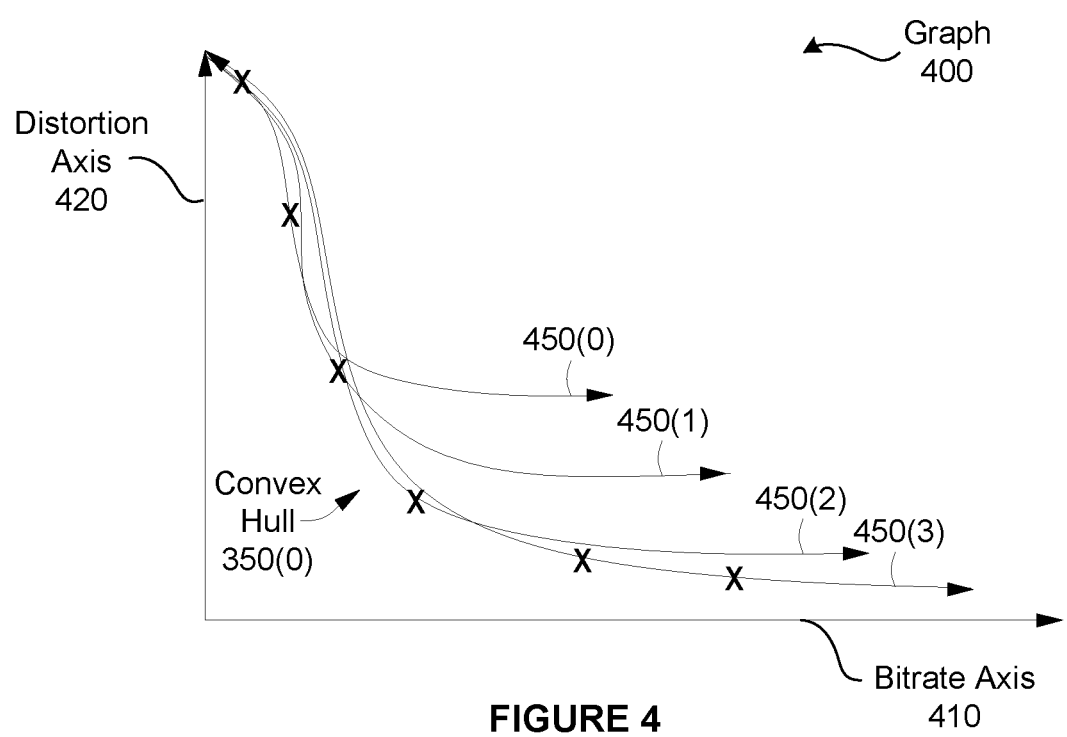
FIG. 4 illustrates the convex hull that is generated by the convex hull generator of FIG. 3, according to various embodiments of the present invention.

FIG. 4 illustrates the convex hull 350(0) that is generated by the convex hull generator 340 of FIG. 3, according to various embodiments of the present invention. In particular, the convex hull generator 340 generates the convex hull 350(0) based on the shot encode set 310(0). As shown, a graph 400 includes, without limitation, a bitrate axis 410 and a distortion axis 420.

In operation, the convex hull generator 340 distributes the shot encode points 320 included in the shot encode set 310(0) into different subsets based on the resolution 322. Subsequently, for each resolution-specific subset, the convex hull generator 340 plots each of the shot encode points 320 by locating the bitrate 332 along the bitrate axis 410 and the distortion level 336 along a distortion axis 420 to generate a corresponding distortion curve 450. In this fashion, the convex hull generator 340 generates the distortion curves 450(0)-450(3), where each of the distortion curves 450 corresponds to a different resolution 322 and includes one or more shot encode points 320.

After generating the distortion curves 450, the convex hull generator 340 evaluates the shot encode points 320 along the distortion curves 450 to determine the convex hull 350($x$). More specifically, the convex hull generator 340 identifies the shot encode points 320 across all the distortion curves 450 that form a boundary where all the shot encode points 320 reside on one side of the boundary (in this case, the right side of the boundary) and also are such that connecting any two consecutive identified shot encode points 320 with a straight line leaves all remaining shot encode points 320 on the same side. The convex hull 350(0) includes the set of the identified shot encode points 320.

Persons skilled in the art will understand that many techniques for generating convex hulls are well known in the field of mathematics, and all such techniques may be implemented to generate the convex hulls 350. In one embodiment, the convex hull generator 340 applies machine-learning techniques to estimate the shot encode points 320 included in the convex hull 350 based on various parameters of the associated source video sequence 132. In this manner, some of the computations discussed thus far may be streamlined and/or avoided entirely.

FIGS. 5A-5D illustrate in greater detail how the trellis iterator 360 of FIG. 3 assembles encoded shot sequences 336 into encoded video sequences 386, according to various embodiments of the present invention. As shown in FIGS. 5A-5D, the sequence trellis 370 includes, without limitation, a shot axis 520 and the bitrate axis 410. The sequence trellis 370 also includes, without limitation, columns of shot encode points 320 included in the convex hulls 350, where each column corresponds to a particular shot sequence 132. For example, the zeroth column included in the sequence trellis 370 corresponds to the shot encode points 320 included in the convex hull 350(0). The shot encode points 320 included in any column are ranked according to ascending bitrate 332 (and, by construction, descending distortion levels 336). The "hull" shot encode points 320 included in any column are also guaranteed to have negative slopes that—in magnitude—are decreasing as a function of the bitrate 332.

For convenience, the hull shot encode points 320 are individually indexed according to the following system. For a given hull shot encode point 320, the first number is an index of the shot sequence 132, and the second number is an index into the bitrate ranking of those hull shot encode points 320. For example, the hull shot encode point 320 00 corresponds to the zeroth shot sequence 132(0) and the zeroth ranked bitrate 332. Similarly, the hull shot encode point 320 43 corresponds to the fourth shot sequence 332(4) and the third ranked bitrate 332 (in this case the highest ranked bitrate 332).

As previously described in conjunction with FIG. 3, each hull shot encode point 320 included within the sequence trellis 370 includes a different encoded shot sequence 326. The trellis iterator 360 generates the encoded video sequences 386 by combining these encoded shot sequences 326. The trellis iterator 360 implements the sequence trellis 370 to iteratively perform this combining technique.

Each of FIGS. 5A-5D illustrates a different version of the sequence trellis 370 generated by the trellis iterator 360 at a different iteration. FIG. 5A illustrates the sequence trellis 370(0) in an initial state. Here, the trellis iterator 360 generates the shot encode sequence 382(0) that includes the hull shot encode points 320 00, 10, 20, 30, and 40. These initially selected hull shot encode points 320 have the lowest bitrate 332 and highest distortion levels 336, and therefore reside at the bottom of the respective columns.

The trellis iterator 360 generates the encoded video sequence 386(0) based on the shot encode sequence 382(0). More precisely, the trellis iterator 360 aggregates the encoded shot sequences 326 included in, sequentially, the hull shot encode points 00, 10, 20, 30, and 40 to generate the encoded video sequence 386(0). Subsequently, the trellis iterator 360 computes the bitrate 332 and the distortion level 336 of the encoded video sequence 386(0). The trellis iterator 360 may compute the bitrate 332 and the distortion level 336 of the encoded video sequence 386(0) in any technically feasible fashion. The trellis iterator 360 then generates the video encode point 380(0) that includes, without limitation, the shot encode sequence 382(0), the encoded video sequence 386(0), the bitrate 332 of the encoded video sequence 386(0), and the distortion level 336 of the encoded video sequence 386(0).

The trellis iterator 360 then computes, for each hull shot encode point 320 within the shot encode sequence 382(0), the rate of change of distortion with respect to bitrate 332 between the hull shot encode point 320 and the above-neighbor of the hull shot encode point 320. For example, the trellis iterator 360 could compute the rate of change of distortion with respect to bitrate 332 between nodes 00 and 01, 10 and 11, 20 and 21, 30 and 31, and 40 and 41. Notably, the computed rate of change for the hull shot encode point 320 that includes a particular encoded shot sequence 326 represents the derivative of the distortion curve 450 associated with that shot sequence 132, taken at the hull shot encode point 320.

The trellis iterator 360 selects the derivative having the greatest magnitude, and then selects the above neighbor associated with that derivative for inclusion in a subsequent shot encode sequence 382. For example, in FIG. 5B, the trellis iterator 360 determines that the derivative associated with hull shot encode point 320 30 is greatest, and therefore includes hull shot encode point 320 31 (the above-neighbor of hull shot encode point 320 30) in the shot encode sequence 382(1). In particular, as shown, the trellis iterator 360 generates the shot encode sequence 382(1) that includes the hull shot encode points 320 00, 10, 20, 31, and 40.

The trellis iterator 360 then generates the encoded video sequence 386(1) based on the shot encode sequence 382(1). More precisely, the trellis iterator 360 aggregates the encoded shot sequences 326 included in, sequentially, the hull shot encode points 00, 10, 20, 31, and 40 to generate the encoded video sequence 386(1). Subsequently, the trellis iterator 360 computes the bitrate 332 and the distortion level 336 of the encoded video sequence 386(1). The trellis iterator 360 then generates the video encode point 380(1) that includes, without limitation, the shot encode sequence 382(1), the encoded video sequence 386(1), the bitrate 332 of the encoded video sequence 386(1), and the distortion level 336 of the encoded video sequence 386(1).

The trellis iterator 360 performs this technique iteratively, thereby ascending the sequence trellis 370, as shown in FIGS. 5C-5D.

In FIG. 5C, the trellis iterator 360 determines that the derivative associated with the hull shot encode point 320 00 is greatest compared to other derivatives, and therefore selects the hull shot encode point 320 01 for inclusion in the shot encode sequence 382(2). As shown, the trellis iterator 360 generates the shot encode sequence 382(2) that includes the hull shot encode points 320 01, 10, 20, 31, and 40.

The trellis iterator 360 then generates the encoded video sequence 386(2) based on the shot encode sequence 382(2). More precisely, the trellis iterator 360 aggregates the encoded shot sequences 326 included in, sequentially, the hull shot encode points 01, 10, 20, 31, and 40 to generate the encoded video sequence 386(2). Subsequently, the trellis iterator 360 computes the bitrate 332 and the distortion level 336 of the encoded video sequence 386(2). The trellis iterator 360 then generates the video encode point 380(2) that includes, without limitation, the shot encode sequence 382(2), the encoded video sequence 386(2), the bitrate 332 of the encoded video sequence 386(2), and the distortion level 336 of the encoded video sequence 386(2).

The trellis iterator 360 continues this process until, as shown in FIG. 5D, generating the video encode point 380(T). The video encode point 380(T) includes, without limitation, the shot encode sequence 382(T), the encoded video sequence 386(T), the bitrate 332 of the encoded video sequence 386(T), and the distortion level 336 of the encoded video sequence 386(T).

In this manner, the trellis iterator 360 incrementally improves the shot encode sequence 382 by selecting a single hull shot encode point 320 for which bitrate is increased and distortion is decreased, thereby generating a collection of encoded video sequences 386 with increasing bitrate and decreasing distortion.

In one embodiment, the trellis iterator 360 adds hull shot encode points 320 prior to ascending the sequence trellis 370 in order to create a terminating condition. In doing so, the trellis iterator 360 may duplicate hull shot encode points 320 having the greatest bitrate 332 to cause the rate of change between the second to last and the last hull shot encode points 320 to be zero. When this zero rate of change is detected for all the shot sequences 132, i.e., when the maximum magnitude of rate of change is exactly zero, the trellis iterator 360 identifies the terminating condition and stops iterating.

Generating New Encoding Points

Figure 6:
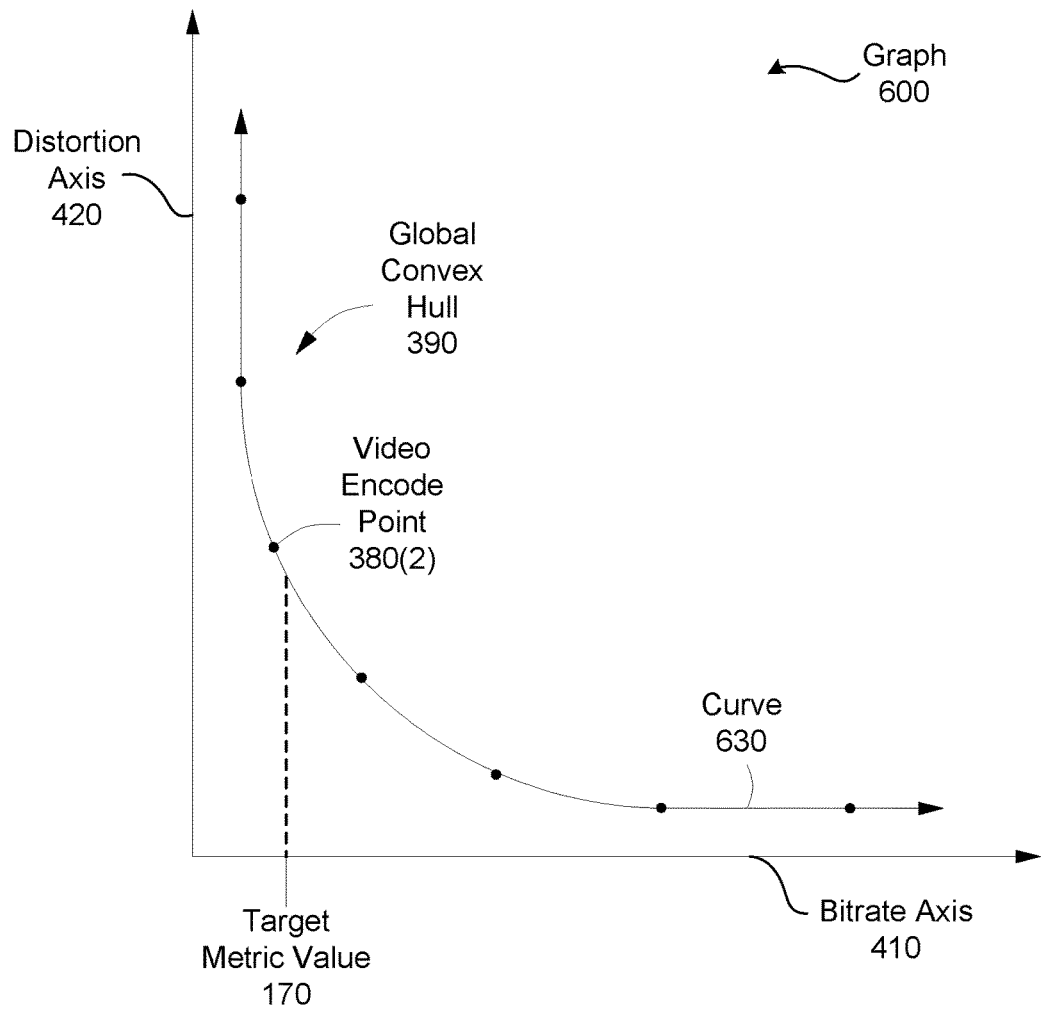
FIG. 6 illustrates the global convex hull that is generated by the dynamic optimizer of FIG. 1 based on the different video encode points shown in FIGS. 5A-5D, according to various embodiments of the present invention.

FIG. 6 illustrates the global convex hull 390 that is generated by the dynamic optimizer 150 of FIG. 1 based on the different video encode points 380 shown in FIGS. 5A-5D, according to various embodiments of the present invention. As shown, a graph 600 includes the bitrate axis 410 and the distortion axis 420.

As described in detail in conjunction with FIGS. 5A-D, the trellis iterator 360 generates the shot encode sequence 382 in an ascending manner to reduce the distortion level 336 and increase the bitrate 332. Consequently, the associated encoded video sequences 386 span a range from high distortion level 336 and low bitrate 332 to low distortion level 336 and high bitrate 332. Among other things, each of the video encode points 380(x) includes the bitrate 332 of the encoded video sequence 386(x) and the distortion level 336 of the encoded video sequence 386(x).

As shown, the dynamic optimizer 150 plots the different video encode points 380 against the bitrate axis 410 and the distortion axis 420, to generate the global convex hull 390. The dynamic optimizer 150 then connects the points (i.e., the video encode points 380) included in the global convex hull 390 to generate a curve 630. Accordingly, the curve 630 represents the distortion level 336 as a function of the bitrate 332 across all the encoded video sequences 386.

[moo] In general, based on the curve 630, the iteration controller 140 can select, for a given bitrate 332, the video encode point 380 that includes the encoded video sequence 386 that minimizes the distortion level 336. Conversely, the iteration controller 140 can select, for a given distortion level 336, the video encode point 380 that includes the encoded video sequence that minimizes the bitrate 332 for the given distortion level 336.

In operation, the iteration controller 140 selects the "optimized" video encode point 380 based on the target metric value 170. The target metric value 170 may be either a target bitrate 332 or a target distortion level 336. In the embodiment depicted in FIG. 6, the target metric value 170 is a target bitrate 332. Accordingly, the iteration controller 140 selects the optimized video encode point 380 that includes the encoded video sequence 386 having the bitrate 332 that lies closest to the target metric value 170.

As shown, based on the target metric value 170, the iteration controller 140 selects the optimized video encode point 380(2) that includes the encoded video sequence 386(2). Notably, the encoded video sequence 386(2) is the video encoded sequence 386 that minimizes the distortion level 336 for the target bitrate 332. In alternate embodiments, the iteration controller 140 selects the optimized video encode point 380 that includes the encoded video sequence 386 having the distortion level 336 that lies closest to the target metric value 170. Notably, the optimized video encode point 380 also includes the "optimized" shot encode sequence 282.

As described previously in conjunction with FIGS. 2 and 5A-5D, the shot encode sequence 282(2) specifies the shot encode points 320 that include encoded shot sequences 326 that are included in the encoded video sequence 386(2). As shown, the encoded video sequence 386(2) includes the encoded shot sequence 326 derived from a 640×360 version of the shot sequence 122(0) and encoded at the QP value of 26, followed by the encoded shot sequence 326 derived from a 640×360 version of the shot sequence 122(1) and encoded at the QP value of 51, followed by the encoded shot sequence 326 derived from a 640×360 version of the shot sequence 122(2) and encoded at the QP value of 51, etc.

In general, each of the "optimized" shot encode points 320 included in the "optimized" shot encode sequence 282 is associated with a different shot sequence 132. For each shot sequence 132(x), the iteration controller 140 evaluates the location of the associated optimized shot encode point 320 along the associated convex hull 350(x) to identify one or more nearby shot encode points 320 points on the convex hull 350(x). Based on the resolutions 322 and the QP values 324 of the optimized shot encode point 320 and the nearby shot encode points 320 the iteration controller 140 may generate any number of new encoding points 220 for the shot sequence 132(x). The iteration controller 140 includes these new encoding points 220 in the encoding list 210(x). In this manner, the iteration controller 140 iteratively refines the range of the encoding points 220 in order to efficiently converge to the optimized encoded video sequence 180 that best matches the target metric value 170.

FIG. 7 illustrates how the iteration controller 150 of FIG. 1 generates additional encoding points 220 for the shot sequence 132(0), according to various embodiments of the present invention. As described in detail in conjunction with FIG. 6, the iteration controller 150 identifies the shot encode point 320(1) that includes the 640×360 shot sequence 122(0) encoded at the QP value 324 of 26 as the optimized shot encode point 320 for the shot sequence 132(0).

Subsequently, the iteration controller 140 generates zero to four new encoding points 220 and adds the new encoding points 220 to the encoding list 210(0) that specifies the encoding points 220 for the shot sequence 132(0). The iteration controller 140 implements the following algorithm to select new encoding points 220. First, the iteration controller 140 identifies the "left" shot encode point 320 that is located to the left and adjacent to the optimized shot encode point 320 along the convex hull 350. If the left shot encode point 320 has the same resolution 322 as the optimized shot encode point 320, then the iteration controller 140 generates a new encoding point 210 that has the resolution 322. The iteration controller 140 sets the QP value 324 of the new encoding point equal to the average of the QP values 324 of the optimized shot encode point 320 and the left shot encode point 320.

If, however, the left shot encode point 320 does not have the same resolution 322 as the optimized shot encode point 320, then the iteration controller 140 generates two new encoding points 210. The iteration controller 140 sets the resolution 322 of the first new encoding point 210 equal to the resolution 322 of the optimized shot encode point 320. The iteration controller 140 sets the QP value 324 of the first new encoding point 210 to the average of the QP value 324 of the optimized shot encode point 320 and the maximum QP value allowed by the video codex. The iteration controller 140 sets the resolution 322 of the second new encoding point 210 equal to the resolution that is immediately lower than the resolution 322 of the optimized shot encode point 320. The iteration controller 142 sets the QP value 324 of the second new encoding point 210 to the minimum QP value allowed by the video codex.

The iteration controller 140 then identifies the "right" shot encode point 320 that is located to the right and adjacent to the optimized shot encode point 320 along the convex hull 350. If the right shot encode point 320 has the same resolution 322 as the optimized shot encode point 320, then the iteration controller 140 generates a new encoding point 210 that has the resolution 322. The iteration controller 140 sets the QP value 324 of the new encoding point equal to the average of the QP values 324 of the optimized shot encode point 320 and the right shot encode point 320.

If, however, the right shot encode point 320 does not have the same resolution 322 as the optimized shot encode point 320, then the iteration controller 140 generates two new encoding points 210. The iteration controller 140 sets the resolution 322 of the first new encoding point 210 equal to the resolution 322 of the optimized shot encode point 320. The iteration controller 140 sets the QP value of the first new encoding point 210 to the average of the QP value 324 of the optimized shot encode point 320 and the minimum QP value allowed by the video codex. The iteration controller 140 sets the resolution 322 of the second new encoding point 210 equal to the resolution that is immediately higher than the resolution 322 of the optimized shot encode point 320. The iteration controller 140 sets the QP value 324 of the second new encoding point 210 to the maximum QP value allowed by the video codex.

Encoding point operations 710 depicts exemplary operations performed by the iteration controller 140. As shown, the optimized shot encode point 320(1) has the resolution 322(1) of 640×360 and the QP value 324(1) of 26. The left shot encode point 320(0) has the resolution 322(0) of 640×360 and the QP value 324(0) of 51. According, the iteration controller 140 adds the new encoding points 220 (6), 220(7), and 220(8) to the encoding list 210(0) (there are already six entries in the encoding list 210(0)). The encoding point 220(6) has the resolution of 322(6) of 640×360 and the QP value 324(6) of (51+26)/2=39. The encoding point 220(7) has the resolution of 322(7) of 640×360 and the QP value 324(7) of (26+1)/2=14. The encoding point 220(8) has the resolution 322(8) of 960×540 and the QP value 324(8) of (26+51)/2=39.

In alternate embodiments, the iteration controller 140 may implement any number and type of algorithms to select new encoding points 220. For instance, in some embodiments, the iteration controller 140 does not restrict the search for additional encoding points 220 based on the convex hull 250. Instead, the iteration controller 140 expands the search to the left of the optimized shot encode point 320, among all available resolutions, to identify the shot encode point 320 having a resolution 322 that is closest but lower than the resolution 322 of the optimized shot encode point 320 and a bitrate 324 just lower. The iteration controller 140 then generates a new encoding point 220 having the resolution 322 of the identified shot encode point 320 and the QP value 324 that is the average of the QP value 324 of the selected shot encode point 320 and one at the same resolution 322 and a slightly lower QP value 324.

In a complementary fashion, the iteration controller 140 expands the search to the right of the optimized shot encode point 320, among all available resolutions, to identify the shot encode point 320 having a resolution 322 that is closest but higher than the resolution 322 of the optimized shot encode point 320 and a bitrate 324 just higher than the bitrate 324 of the optimized shot encode point 320. The iteration controller 140 then generates a new encoding point 220 having the resolution 322 of the identified shot encode point 320 and QP value that is the average between the QP value 324 of the selected shot encode point 320 and one at the same resolution 322 and a slightly higher QP value 324.

For each of the shot sequences 132(x), after identifying any new encoding points 220 for the shot sequence 132(x), the iteration controller 140 discards any of the new encoding points 220 that are already included in the encoding list 210(x) associated with the shot sequence 132(x). The iteration controller 140 then adds any remaining new encoding points 220(x) associated with the shot sequence 132(x) to the encoding list 210(x). If the iteration controller 140 adds any new encoding points 220 to any of the encoding lists 210, then the iteration controller 140 configures the dynamic optimizer 150 to re-execute based on the updated encoding lists 210. If, however, the iteration controller 140 does not add any new encoding points 220 to any of the encoding lists 210, then the iteration controller 140 determines that the iteration controller 140 has converged to the optimized video encode point 380 having the encoded video sequence 386 that best matches the target metric value 170. Consequently, the iteration controller 140 sets the optimized video sequence 180 equal to the encoded video sequence 386 included in the optimized video encode point 380.

In alternate embodiments, the iteration controller 140 may determine that the iteration controller 140 has converged to the optimized video encode point 380 having the encoded video sequence 386 that sufficiently matches the target metric value 170 in any technically feasible fashion. For instance, in some embodiments, the iteration controller 140 may stop iterating (e.g., re-executing the dynamic optimizer 150) when a total number of iterations is equal to a maximum iterations configuration parameter (e.g., 5 iterations). In other embodiments, the iteration controller 140 may measure the improvement obtained at each iteration and stop iterating after the improvement is less than an improvement configuration parameter (e.g., 1%). In yet other embodiments, the iteration controller 140 may track the amount of processor resources consumed by the iterative encoding application 120 and stop iterating after the amount of processor resources is higher than a processor limit configuration parameter.

After determining the optimized video sequence 180, the iteration controller 140 transmits the optimized video sequence 180 to the CDN 190 in any technically feasible fashion. In alternate embodiments, the iteration controller 140 may periodically transmit the encoded video sequence 386 included in the optimized video encode point 380 to the CDN 190. In this fashion, the iteration controller 140 enables endpoint devices to display the media title while the iteration controller 140 continues to iterate.

Figure 8:
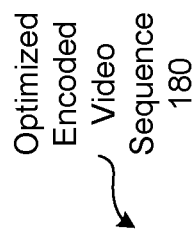
FIG. 8 is a more detailed illustration of the optimized encoded video sequence of FIG. 1, according to various embodiments of the present invention.

FIG. 8 is a more detailed illustration of the optimized encoded video sequence 180 of FIG. 1, according to various embodiments of the present invention. Advantageously, the iterative encoding application 120 optimizes each of the encoded shot sequences 326 included in the optimized encoded video sequence 180 based on the target metric value 170.

As shown, the optimized encoded video sequence 180 includes the encoded shot sequence 326 derived from a 960×540 version of the shot sequence 122(0) and encoded at the QP value of 40, followed by the encoded shot sequence 326 derived from a 640×360 version of the shot sequence 122(1) and encoded at the QP value of 11, followed by the encoded sot sequence 326 derived from a 1280×720 version of the shot sequence 122(2) and encoded at the QP value of 47, etc.

Figure 9A:
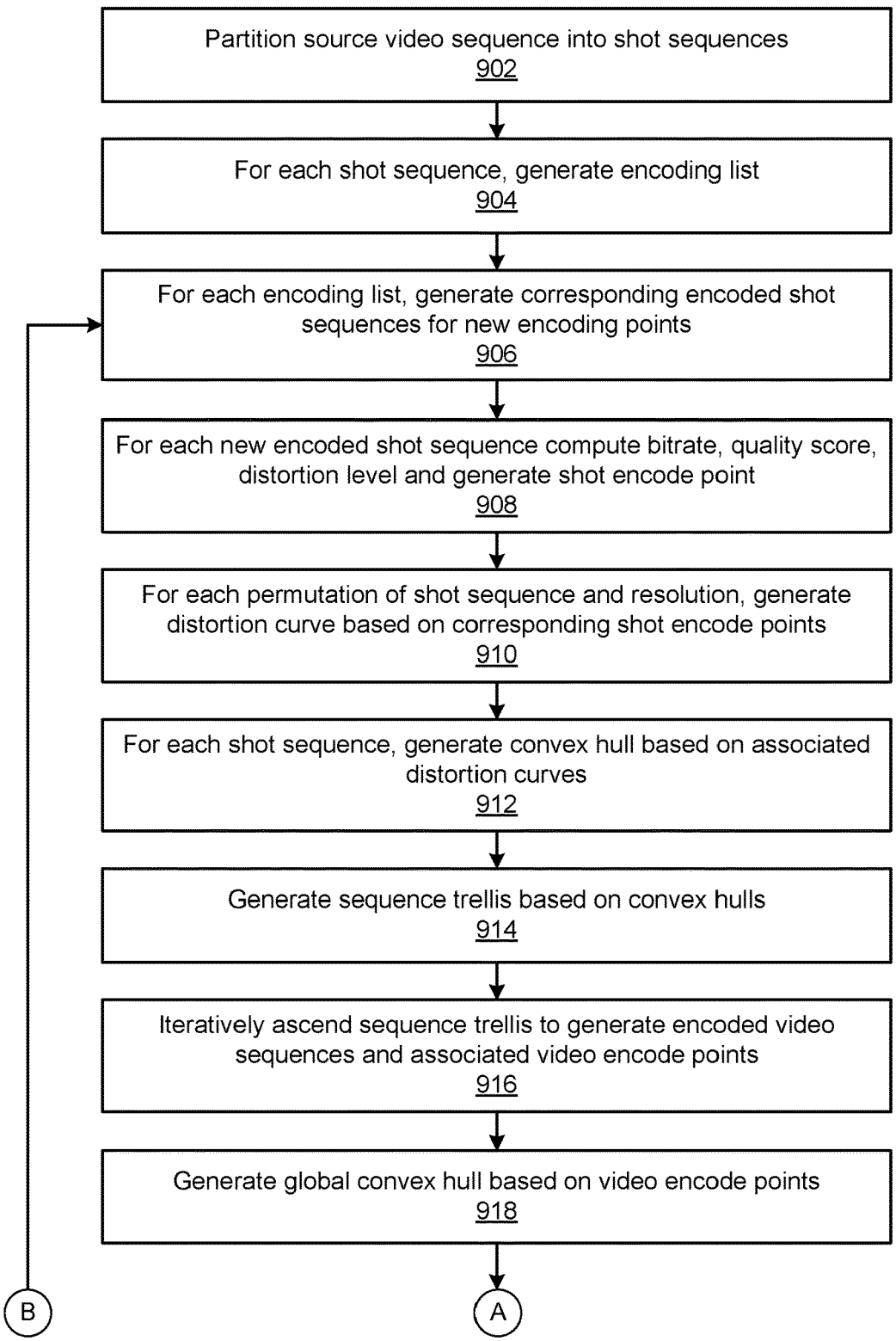
FIGS. 9A-9B set forth a flow diagram of method steps for encoding a source video sequence, according to various embodiments of the present invention.
Figure 9B:
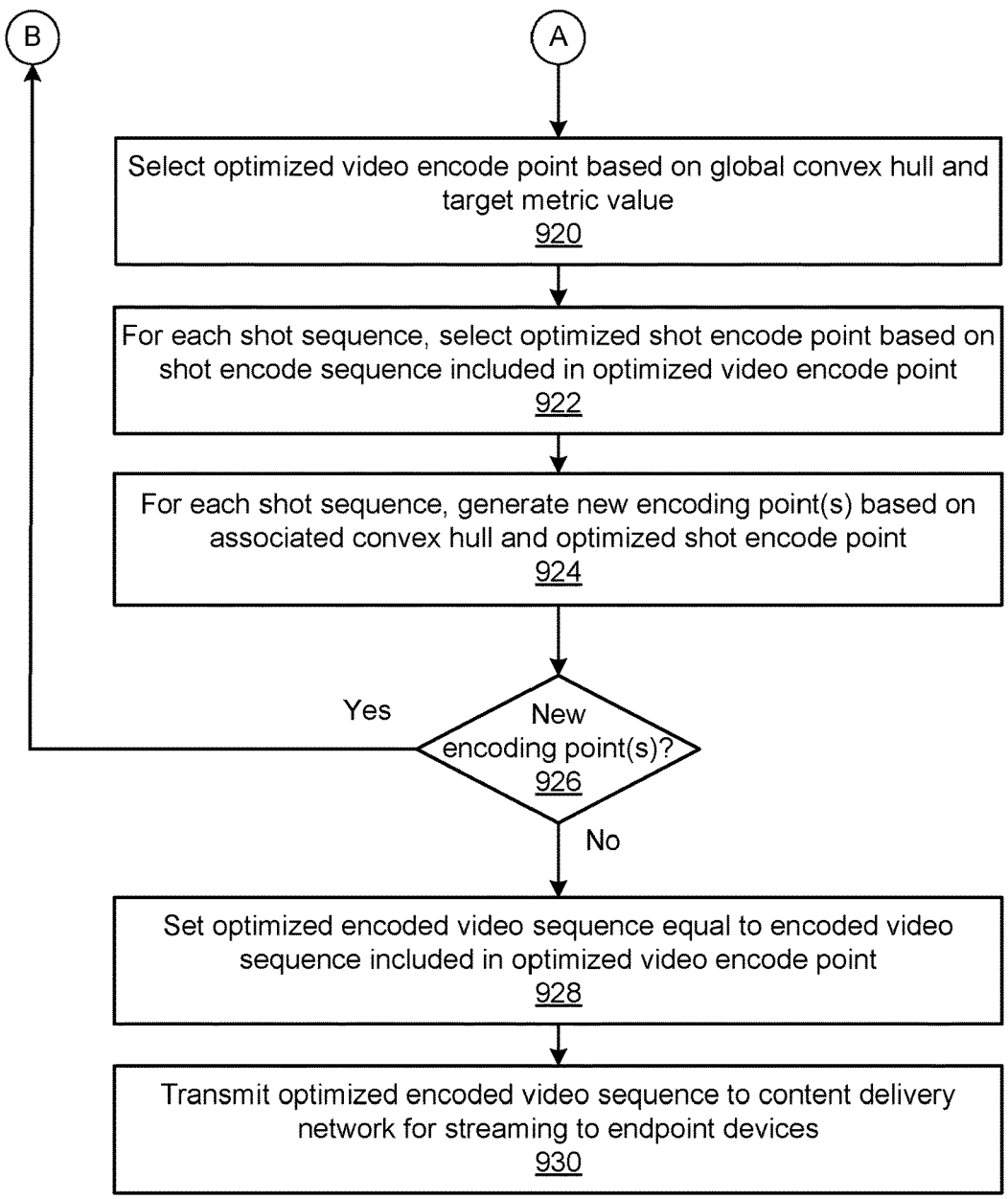

FIGS. 9A-9B set forth a flow diagram of method steps for encoding a source video sequence, according to various embodiments of the present invention. Although the method steps are described with reference to the systems of FIGS. 1-8, persons skilled in the art will understand that any system configured to implement the method steps, in any order, falls within the scope of the present invention.

As shown, a method 900 begins at step 902, where the shot analyzer 130 partitions the source video sequence 122 into the shot sequences 132. At step 904, for each of the shot sequences 132, the iteration controller 140 generates the encoding lists 210. Each of the encoding points 220 included in the encoding lists 210 includes the resolution 322 and the QP value 324. In alternate embodiments, each of the encoding points 220 may specify any number and type of encoding parameters instead of or in addition to the QP value 324.

At step 906, for each of the encoding lists 210, the dynamic optimizer 150 identifies the new encoding points 220 and generates the corresponding encoded shot sequences 326. At step 908, for each of the new encoded shot sequences 326, the dynamic optimizer 150 computes the bitrate 332, the quality score 334, and the distortion level 336. Subsequently, the dynamic optimizer 150 generates the new shot encode point 320 that includes, without limitation, the encoded shot sequence 326, the resolution 322, the QP value 324, the bitrate 332, the quality score 334, the distortion level 336.

At step 910, for each permutation of the shot sequence 132 and the resolution 322, the convex hull generator 340 generates the associated distortion curve 450 based on the corresponding shot encode points 320. At step 912, for each of the shot sequences 132(x), the convex hull generator 340 generates the convex hull 350(x) based on the associated distortion curves 450. At step 914, the trellis iterator 360 generates the sequence trellis 370 based on the convex hulls 350. At step 916, the trellis iterator 360 iteratively ascends the sequence trellis 370 to generate the encoded video sequences 386 and the associated video encode points 380. At step 918, the trellis iterator 360 generates the global convex hull 290 based on the video encode points 380.

At step 920, the iteration controller 140 selects the optimized video encode point 380 based on the global convex hull 290 and the target metric value 170. At step 922, for each of the shot sequence 132, the iteration controller 140 selects the optimized shot encode point 320 based on the shot encode sequence 382 included in the optimal video encode point 380. At step 924, for each of the shot sequences 232(x), the iteration controller 140 generates new encoding point(s) 220 based on the convex hull 350(x) and optimized shot encode point 320 associated with the shot sequence 232(x). At step 926, the iteration controller 140 determines whether there are any new encoding points(s) 220. If, at step 926, the iteration controller 140 determines that there are new encoding point(s) 220, then the method 900 returns to step 960, where the dynamic optimizer 150 generates new encoded shot sequences 326 for the new encoding points(s) 220.

If, however, at step 926, the iteration controller 140 determines that there are no new encoding point(s) 220, then the method 900 proceeds to step 928. At step 928, the iteration controller 140 sets the optimized encoded video sequence 180 equal to encoded video sequence 386 included in optimized video encode point 380. At step 930, the iteration controller 140 transmits the optimized encoded video sequence 180 to the content delivery network 190 for streaming to endpoint devices. The method 900 then terminates.

In sum, the disclosed techniques enable efficient and optimal encoding of source video sequences based on a target metric value. An iterative encoding application includes, without limitation, a shot analyzer, an iteration controller, and a dynamic optimizer. First the shot analyzer partitions a source video sequence into multiple shot sequences. Subsequently, for each shot sequence, the iteration controller initializes an encoding list to include relatively sparsely distributed encoding points. Each encoding point specifies a resolution and a quantization parameter (QP). The iteration controller then configures the dynamic optimizer to generate a global convex hull based on the encoding lists.

First, the dynamic optimizer generates new shot encode points based on the new encoding points included in the encoding lists. A "new" encoding point is an encoding point for which the dynamic optimizer has not previous generated an associated encoded shot sequence. Each shot encode point includes, without limitation, an encoded shot sequence, a resolution, a QP value, a quality score, a distortion level, and a bitrate. Subsequently, for each shot sequence, the dynamic optimizer generates a convex hull that includes a subset of the shot encode points associated with the shot sequence. In general, for a given shot sequence, the shot encode points included in the associated convex hull maximize the bitrate for different distortion levels.

The dynamic optimizer then evaluates the convex hulls across all of the shot sequences to determine shot encode sequences. Each shot encode sequence specifies shot encode points for the different shot sequences. For each shot encode sequence, the dynamic optimizer aggregates the different encoded shot sequences included in the shot encode points to generate an encoded video sequence. For each shot encode sequence, the dynamic optimizer then generates a video encode point that includes the shot encode sequence, the associated encoded video sequence, an overall bitrate for the encoded shot sequence, and an overall distortion level for the encoded shot sequence. Subsequently, the dynamic optimizer generates a global convex hull based on the video encode points. In general, for the source video sequence, each of the video encode points included in the global convex hull minimizes the overall bitrate for a different overall distortion level.

The iteration controller selects an optimized video encode point from the global convex hull based on a target metric value (e.g., bitrate or quality score). For each shot sequence, the optimized video encode point specifies an optimized shot encode point. For each shot sequence, the iteration controller evaluates the location of the optimized shot encode point along the associated convex hull to identify one or more nearby shot encodes. Based on the resolutions and the QP values of the optimized shot encode point and the nearby shot encode points, the iteration controller may generate any number of new encoding points for the shot sequence. If, the iteration controller identifies any new encoding points, then the iteration controller configures the dynamic optimizer to generate a new global convex hull based on the expanded set of encoding points.

If, however, the iteration controller does not identify any new encoding points, then the iteration controller selects the encoded video sequence included in optimized video encode point as the optimized encoded video sequence. Finally, the iteration controller transmits the optimized encoded video sequence to a content delivery network for distribution to endpoint devices.

At least one technological improvement of the disclosed techniques relative to prior art is that iteratively converging to an optimized encoded video sequence that includes individually encoded shot sequences reduces the encoding inefficiencies typically associated with conventional encoding techniques. Such encoding inefficiencies not only needlessly waste computational and storage resources, these types of inefficiencies also unnecessarily increase the bandwidth required to stream encoded versions of media titles to endpoint devices.

1. In some embodiments, a computer-implemented method comprises generating a first set of shot encode points based on a first set of encoding points and a first shot sequence included in a source video sequence that is associated with a media title, wherein each shot encode point is associated with a different encoded shot sequence; performing one or more convex hull operations across the first set of shot encode points to generate a first convex hull that is associated with the first shot sequence; generating a plurality of encoded video sequences based on the first convex hull and a second convex hull that is associated with a second shot sequence included in the source video sequence; computing a first encoding point that is not included in the first set of encoding points based on the plurality of encoded video sequences and a target value for a first video metric; and generating an optimized encoded video sequence based on the first encoding point, wherein at least a portion of the optimized encoded video sequence is subsequently streamed to an endpoint device during a playback of the media title.

2. The computer-implemented method of clause 1, wherein generating the optimized encoded video sequence comprises generating a first encoded shot sequence based on the first shot sequence and the first encoding point; generating a second encoded shot sequence based on the second shot sequence and a second encoding point that is not equal to the first encoding point; and aggregating the first encoded shot sequence and the second encoded shot sequence.

3. The computer-implemented method of clauses 1 or 2, wherein performing the one or more convex hull operations comprises determining a region that includes the first set of shot encode points; identifying a boundary of the region, wherein no shot encode points included in the first set of shot encode points are located on a first side of the boundary; and discarding any shot encode points included in the first set of shot encode points that are not located along the boundary to generate the first convex hull.

4. The computer-implemented method of any of clauses 1-3, wherein generating the plurality of encoded video sequences comprises computing a first slope value between a first shot encode point and a second shot encode point, wherein both the first shot encode point and the second shot encode point are included in the first convex hull; selecting a first encoded shot sequence associated with the second shot encode point based on the first slope value; and aggregating the first encoded shot sequence with a second encoded shot sequence to generate a first encoded video sequence, wherein the second encoded shot sequence is associated with a third shot encode point included in the second convex hull.

5. The computer-implemented method of any of clauses 1-4, wherein computing the first encoding point comprises generating a global convex hull based on the plurality of encoded video sequences, wherein the global convex hull includes a first set of video encode points; selecting a first video encode point included in the first set of video encode points based on the target value; and determining the first encoding point based on the first video encode point and the first convex hull.

6. The computer-implemented method of any of clauses 1-5, wherein computing the first encoding point comprises identifying a first encoded video sequence included in the plurality of encoded video sequences based on the target value; identifying a first shot encode point that is associated with the first encoded video sequence and is included in the first convex hull; identifying a second shot encode point included in the first convex hull based on a distance between the first shot encode point and the second shot encode point; and performing at least one arithmetic operation based on the first shot encode point and the second shot encode point.

7. The computer-implemented method of any of clauses 1-6, wherein performing the at least one arithmetic operation comprises computing an average of a first value of an encoding parameter and a second value of the encoding parameter, and wherein the first value of the encoding parameter is associated with the first shot encode point and the second value of the encoding parameter is associated with the second shot encode point.

8. The computer-implemented method of any of clauses 1-7, wherein computing the first encoding point comprises identifying a first encoded video sequence included in the plurality of encoded video sequences based on the target value; identifying a first shot encode point that is associated with the first encoded video sequence and is included in the first convex hull; identifying a second shot encode point included in the first convex hull based on a distance between the first shot encode point and the second shot encode point; determining that a first resolution associated with the first shot encode point is not equal to a second resolution associated with the second shot encode point; setting, based on the first resolution and the second resolution, an endpoint value of an encoding parameter equal to either a maximum value of the encoding parameter or a minimum value of the encoding parameter; and performing at least one arithmetic operation between a first value of the encoding parameter that is associated with the first shot encode point and the endpoint value of the encoding parameter.

9. The computer-implemented method of any of clauses 1-8, wherein the first video metric comprises a bitrate, a peak signal-to-noise-ratio (PSNR), a linear video multimethod assessment fusion (VMAF) metric, a harmonic VMAF (VMAFh) metric, or a distortion metric.

10. In some embodiments, a computer-readable storage medium includes instructions that, when executed by a processor, cause the processor to perform the steps of generating a first set of shot encode points based on a first set of encoding points and a first shot sequence included in a source video sequence that is associated with a media title, wherein each shot encode point is associated with a different encoded shot sequence; performing one or more convex hull operations across the first set of shot encode points to generate a first convex hull that is associated with the first shot sequence; generating a global convex hull based on the first convex hull and a second convex hull that is associated with a second shot sequence included in the source video sequence; computing a first encoding point that is not included in the first set of encoding points based on a target value for a first video metric, the global convex hull, and the first convex hull; and generating an optimized encoded video sequence based on the first encoding point, wherein at least a portion of the optimized encoded video sequence is subsequently streamed to an endpoint device during a playback of the media title.

11. The computer-readable storage medium of clause 10, wherein generating the optimized encoded video sequence comprises generating a first encoded shot sequence based on the first shot sequence and the first encoding point; generating a second encoded shot sequence based on the second shot sequence and a second encoding point that is not equal to the first encoding point; and aggregating the first encoded shot sequence and the second encoded shot sequence.

12. The computer-readable storage medium of clauses 10 or 11, wherein performing the one or more convex hull operations comprises determining a region that includes the first set of shot encode points; identifying a boundary of the region, wherein no shot encode points included in the first set of shot encode points are located on a first side of the boundary; and discarding any shot encode points included in the first set of shot encode points that are not located along the boundary to generate the first convex hull.

13. The computer-readable storage medium of any of clauses 10-12, wherein each shot encode point included in the first convex hull is associated with both a bitrate and a value for either a distortion metric or a visual quality metric.

14. The computer-readable storage medium of any of clauses 10-13, wherein generating the global convex hull comprises computing a first slope value between a first shot encode point and a second shot encode point, wherein both the first shot encode point and the second shot encode point are included in the first convex hull; selecting a first encoded shot sequence associated with the second shot encode point based on the first slope value; aggregating the first encoded shot sequence with a second encoded shot sequence to generate a first encoded video sequence, wherein the second encoded shot sequence is associated with a third shot encode point included in the second convex hull; generating a first video encode point based on the first encoded video sequence; and adding the first video encode point to a partial global convex hull to generate the global convex hull.

15. The computer-readable storage medium of any of clauses 10-14, wherein computing the first encoding point comprises selecting a first video encode point included in the global convex hull based on the target value; and selecting a first shot encode point included in the first convex hull based on the first video encode point; identifying a second shot encode point included in the first convex hull based on a distance between the first shot encode point and the second shot encode point; and performing at least one arithmetic operation based on the first shot encode point and the second shot encode point.

16. The computer-readable storage medium of any of clauses 10-15, wherein performing the at least one arithmetic operation comprises computing an average of a first resolution associated with the first shot encode point and a second resolution associated with the second shot encode point.

17. The computer-readable storage medium of any of clauses 10-16, wherein computing the first encoding point comprises selecting a first video encode point included in the global convex hull based on the target value; and selecting a first shot encode point included in the first convex hull based on the first video encode point; identifying a second shot encode point included in the first convex hull based on a distance between the first shot encode point and the second shot encode point; determining that a first resolution associated with the first shot encode point is not equal to a second resolution associated with the second shot encode point; setting, based on the first resolution and the second resolution, an endpoint value of an encoding parameter equal to either a maximum value of the encoding parameter or a minimum value of the encoding parameter; and performing at least one arithmetic operation between a first value of the encoding parameter that is associated with the first shot encode point and the endpoint value of the encoding parameter.

18. The computer-readable storage medium of any of clauses 10-17, wherein the first encoding point specifies at least one of a resolution and an encoding parameter.

19. In some embodiments a system comprises a memory storing instructions; and a processor that is coupled to the memory and, when executing the instructions, is configured to partition a video sequence that is associated with a media title into a plurality of frame sets; generate a first set of shot encode points based on a first set of encoding points and a first frame set included in the plurality of frame sets, wherein each shot encode point is associated with a different encoded frame set; perform one or more convex hull operations across the first set of shot encode points to generate a first convex hull that is associated with the first frame set; generate a plurality of encoded video sequences based on the first convex hull and a second convex hull that is associated with a second frame set included in the plurality of frame sets; compute a first encoding point that is not included in the first set of encoding points based on the plurality of encoded video sequences and a target value for a first video metric; and generate an optimized encoded video sequence based on the first encoding point, wherein at least a portion of the optimized encoded video sequence is subsequently streamed to an endpoint device during a playback of the media title.

20. The system of clause 19, wherein the processor is configured to determine the generate the optimized encoded video sequence by generating a first encoded frame set based on the first frame set and the first encoding point; generating a second encoded frame set based on the second frame set and a second encoding point that is not equal to the first encoding point; and aggregating the first encoded frame set and the second encoded frame set.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   generating a first set of shot encode points based on a first set of encoding points and a first shot sequence included in a source video sequence that is associated with a media title, wherein each shot encode point is associated with a different encoded shot sequence;
   performing one or more operations across the first set of shot encode points to generate a first convex hull that is associated with the first shot sequence;
   generating a plurality of encoded video sequences based on (i) the first convex hull and (ii) a second convex hull that is associated with a second shot sequence included in the source video sequence;
   computing a first encoding point that is not included in the first set of encoding points based on the plurality of encoded video sequences and a target value for a first video metric; and
   generating an optimized encoded video sequence based on the first encoding point, wherein at least a portion of the optimized encoded video sequence is subsequently streamed to an endpoint device during a playback of the media title.

2. The computer-implemented method of claim 1, wherein generating the optimized encoded video sequence comprises:
   generating a first encoded shot sequence based on the first shot sequence and the first encoding point;
   generating a second encoded shot sequence based on the second shot sequence and a second encoding point that is not equal to the first encoding point; and
   aggregating the first encoded shot sequence and the second encoded shot sequence.

3. The computer-implemented method of claim 1, wherein performing the one or more operations comprises:
   determining a region that includes the first set of shot encode points;
   identifying a boundary of the region, wherein no shot encode points included in the first set of shot encode points are located on a first side of the boundary; and
   discarding any shot encode points included in the first set of shot encode points that are not located along the boundary to generate the first convex hull.

4. The computer-implemented method of claim 1, wherein generating the plurality of encoded video sequences comprises:
   computing a first slope value between a first shot encode point and a second shot encode point, wherein both the first shot encode point and the second shot encode point are included in the first convex hull;
   selecting a first encoded shot sequence associated with the second shot encode point based on the first slope value; and
   aggregating the first encoded shot sequence with a second encoded shot sequence to generate a first encoded video sequence, wherein the second encoded shot sequence is associated with a third shot encode point included in the second convex hull.

5. The computer-implemented method of claim 1, wherein computing the first encoding point comprises:
   generating a global convex hull based on the plurality of encoded video sequences, wherein the global convex hull includes a first set of video encode points;
   selecting a first video encode point included in the first set of video encode points based on the target value; and
   determining the first encoding point based on the first video encode point and the first convex hull.

6. The computer-implemented method of claim 1, wherein computing the first encoding point comprises:
   identifying a first encoded video sequence included in the plurality of encoded video sequences based on the target value;
   identifying a first shot encode point that is associated with the first encoded video sequence and is included in the first convex hull;
   identifying a second shot encode point included in the first convex hull based on a distance to the first shot encode point; and
   performing at least one arithmetic operation based on the first shot encode point and the second shot encode point.

7. The computer-implemented method of claim 6, wherein performing the at least one arithmetic operation comprises computing an average of a first value of an encoding parameter and a second value of the encoding parameter, and wherein the first value of the encoding parameter is associated with the first shot encode point and the second value of the encoding parameter is associated with the second shot encode point.

8. The computer-implemented method of claim 1, wherein computing the first encoding point comprises:
   identifying a first encoded video sequence included in the plurality of encoded video sequences based on the target value;
   identifying a first shot encode point that is associated with the first encoded video sequence and is included in the first convex hull;
   identifying a second shot encode point included in the first convex hull based on a distance between the first shot encode point and the second shot encode point;

determining that a first resolution associated with the first shot encode point is not equal to a second resolution associated with the second shot encode point;

setting, based on the first resolution and the second resolution, an endpoint value of an encoding parameter equal to either a maximum value of the encoding parameter or a minimum value of the encoding parameter; and performing at least one arithmetic operation between a first value of the encoding parameter that is associated with the first shot encode point and the endpoint value of the encoding parameter.

9. The computer-implemented method of claim 1, wherein the first video metric comprises a bitrate, a peak signal-to-noise-ratio (PSNR), a linear video multimethod assessment fusion (VMAF) metric, a harmonic VMAF (VMAFh) metric, or a distortion metric.

10. A non-transitory computer-readable storage medium including instructions that, when executed by a processor, cause the processor to perform the steps of:

generating a first set of shot encode points based on a first set of encoding points and a first shot sequence included in a source video sequence that is associated with a media title, wherein each shot encode point is associated with a different encoded shot sequence;

performing one or more operations across the first set of shot encode points to generate a first convex hull that is associated with the first shot sequence;

generating a global convex hull based on (i) the first convex hull and (ii) a second convex hull that is associated with a second shot sequence included in the source video sequence;

computing a first encoding point that is not included in the first set of encoding points based on a target value for a first video metric, the global convex hull, and the first convex hull; and generating an optimized encoded video sequence based on the first encoding point, wherein at least a portion of the optimized encoded video sequence is subsequently streamed to an endpoint device during a playback of the media title.

11. The computer-readable storage medium of claim 10, wherein generating the optimized encoded video sequence comprises:

generating a first encoded shot sequence based on the first shot sequence and the first encoding point;

generating a second encoded shot sequence based on the second shot sequence and a second encoding point that is not equal to the first encoding point; and aggregating the first encoded shot sequence and the second encoded shot sequence.

12. The computer-readable storage medium of claim 10, wherein performing the one or more operations comprises:

determining a region that includes the first set of shot encode points;

identifying a boundary of the region, wherein no shot encode points included in the first set of shot encode points are located on a first side of the boundary; and discarding any shot encode points included in the first set of shot encode points that are not located along the boundary to generate the first convex hull.

13. The computer-readable storage medium of claim 12, wherein each shot encode point included in the first convex hull is associated with both a bitrate and a value for either a distortion metric or a visual quality metric.

14. The computer-readable storage medium of claim 10, wherein generating the global convex hull comprises:

computing a first slope value between a first shot encode point and a second shot encode point, wherein both the first shot encode point and the second shot encode point are included in the first convex hull;

selecting a first encoded shot sequence associated with the second shot encode point based on the first slope value;

aggregating the first encoded shot sequence with a second encoded shot sequence to generate a first encoded video sequence, wherein the second encoded shot sequence is associated with a third shot encode point included in the second convex hull;

generating a first video encode point based on the first encoded video sequence; and adding the first video encode point to a partial global convex hull to generate the global convex hull.

15. The computer-readable storage medium of claim 10, wherein computing the first encoding point comprises:

selecting a first video encode point included in the global convex hull based on the target value; and selecting a first shot encode point included in the first convex hull based on the first video encode point;

identifying a second shot encode point included in the first convex hull based on a distance between the first shot encode point and the second shot encode point; and performing at least one arithmetic operation based on the first shot encode point and the second shot encode point.

16. The computer-readable storage medium of claim 15, wherein performing the at least one arithmetic operation comprises computing an average of a first resolution associated with the first shot encode point and a second resolution associated with the second shot encode point.

17. The computer-readable storage medium of claim 10, wherein computing the first encoding point comprises:

selecting a first video encode point included in the global convex hull based on the target value; and selecting a first shot encode point included in the first convex hull based on the first video encode point;

identifying a second shot encode point included in the first convex hull based on a distance between the first shot encode point and the second shot encode point;

determining that a first resolution associated with the first shot encode point is not equal to a second resolution associated with the second shot encode point;

setting, based on the first resolution and the second resolution, an endpoint value of an encoding parameter equal to either a maximum value of the encoding parameter or a minimum value of the encoding parameter; and performing at least one arithmetic operation between a first value of the encoding parameter that is associated with the first shot encode point and the endpoint value of the encoding parameter.

18. The computer-readable storage medium of claim 10, wherein the first encoding point specifies at least one of a resolution and an encoding parameter.

19. A system, comprising:

a memory storing instructions; and a processor that is coupled to the memory and, when executing the instructions, is configured to:

partition a video sequence that is associated with a media title into a plurality of frame sets, generate a first set of shot encode points based on a first set of encoding points and a first frame set included in the plurality of frame sets, wherein each shot encode point is associated with a different encoded frame set, perform one or more operations across the first set of shot encode points to generate a first convex hull that is associated with the first frame set, generate a plurality of encoded video sequences based on (i) the first convex hull and (ii) a second convex hull that is associated with a second frame set included in the plurality of frame sets, compute a first encoding point that is not included in the first set of encoding points based on the plurality of encoded video sequences and a target value for a first video metric, and generate an optimized encoded video sequence based on the first encoding point, wherein at least a portion of the optimized encoded video sequence is subsequently streamed to an endpoint device during a playback of the media title.

20. The system of claim 19, wherein the processor is configured to generate the optimized encoded video sequence by:

generating a first encoded frame set based on the first frame set and the first encoding point;

generating a second encoded frame set based on the second frame set and a second encoding point that is not equal to the first encoding point; and aggregating the first encoded frame set and the second encoded frame set.

* * * * *